(12) United States Patent
Moll et al.

(10) Patent No.: US 8,176,229 B2
(45) Date of Patent: *May 8, 2012

(54) HYPERTRANSPORT/SPI-4 INTERFACE SUPPORTING CONFIGURABLE DESKEWING

(75) Inventors: Laurent R. Moll, Saratoga, CA (US); Manu Gulati, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 12/362,679

(22) Filed: Jan. 30, 2009

(65) Prior Publication Data

US 2009/0138749 A1  May 28, 2009

Related U.S. Application Data

(63) Continuation of application No. 10/742,060, filed on Dec. 20, 2003, now Pat. No. 7,490,187, which is a continuation-in-part of application No. 10/356,390, filed on Jan. 31, 2003, now abandoned.

(60) Provisional application No. 60/380,740, filed on May 15, 2002, provisional application No. 60/419,032, filed on Oct. 16, 2002.

(51) Int. Cl.
    *G06F 13/20* (2006.01)
(52) U.S. Cl. ............ 710/313; 710/11; 710/14; 710/105; 713/503
(58) Field of Classification Search .................. 710/313, 710/11, 14, 105; 713/503
See application file for complete search history.

(56) References Cited

U.S. PATENT DOCUMENTS

| | | | |
|---|---|---|---|
| 6,005,412 A * | 12/1999 | Ranjan et al. | 326/63 |
| 6,335,901 B1 * | 1/2002 | Morita et al. | 365/233.1 |
| 6,748,479 B2 * | 6/2004 | Sano et al. | 710/316 |
| 7,036,037 B1 * | 4/2006 | Paul et al. | 713/401 |
| 7,167,995 B2 * | 1/2007 | Chiang | 713/503 |
| 7,170,907 B1 * | 1/2007 | Reches | 370/516 |
| 2003/0117166 A1 * | 6/2003 | Ingino et al. | 326/30 |
| 2003/0196132 A1 * | 10/2003 | Chiang | 713/503 |
| 2006/0277346 A1 * | 12/2006 | Doak et al. | 710/305 |

* cited by examiner

*Primary Examiner* — Mark Rinehart
*Assistant Examiner* — Nimesh G Patel
(74) *Attorney, Agent, or Firm* — Garlick & Markison; Kevin L. Smith

(57) ABSTRACT

A dual mode digital interface supports the HyperTransport Standard and at least one other interface standard. The dual mode digital interface includes a plurality of data line deskew/sampling blocks, a data group deskew module, and an enablement control module. The plurality of data line deskew/sampling blocks deskew and sample incoming data on respective data lines based upon a clock signal to produce deskewed data. The data group deskew module receives deskewed data from each of the plurality of data line deskew/sampling blocks and removes inter-data line skew from the deskewed data to produce received data. The plurality of data line deskew/sampling blocks and the data group deskew module can be configured in a first mode when supporting an aspect of the HyperTransport Standard and configured in a second mode when supporting the at least one other interface standard. In the alternative, a plurality of data line deskew/sampling blocks and the data group deskew module may be set based upon a training sequence received from a link partner.

20 Claims, 15 Drawing Sheets processing system 10 processing system 20 processing system 30 multiple processor device 40 data mapping for I/O modules 62, 64, 70, and/or 72

Rx I/O module 64 and/or 70

FIG. 7 Rx I/O module 64 and/or 70

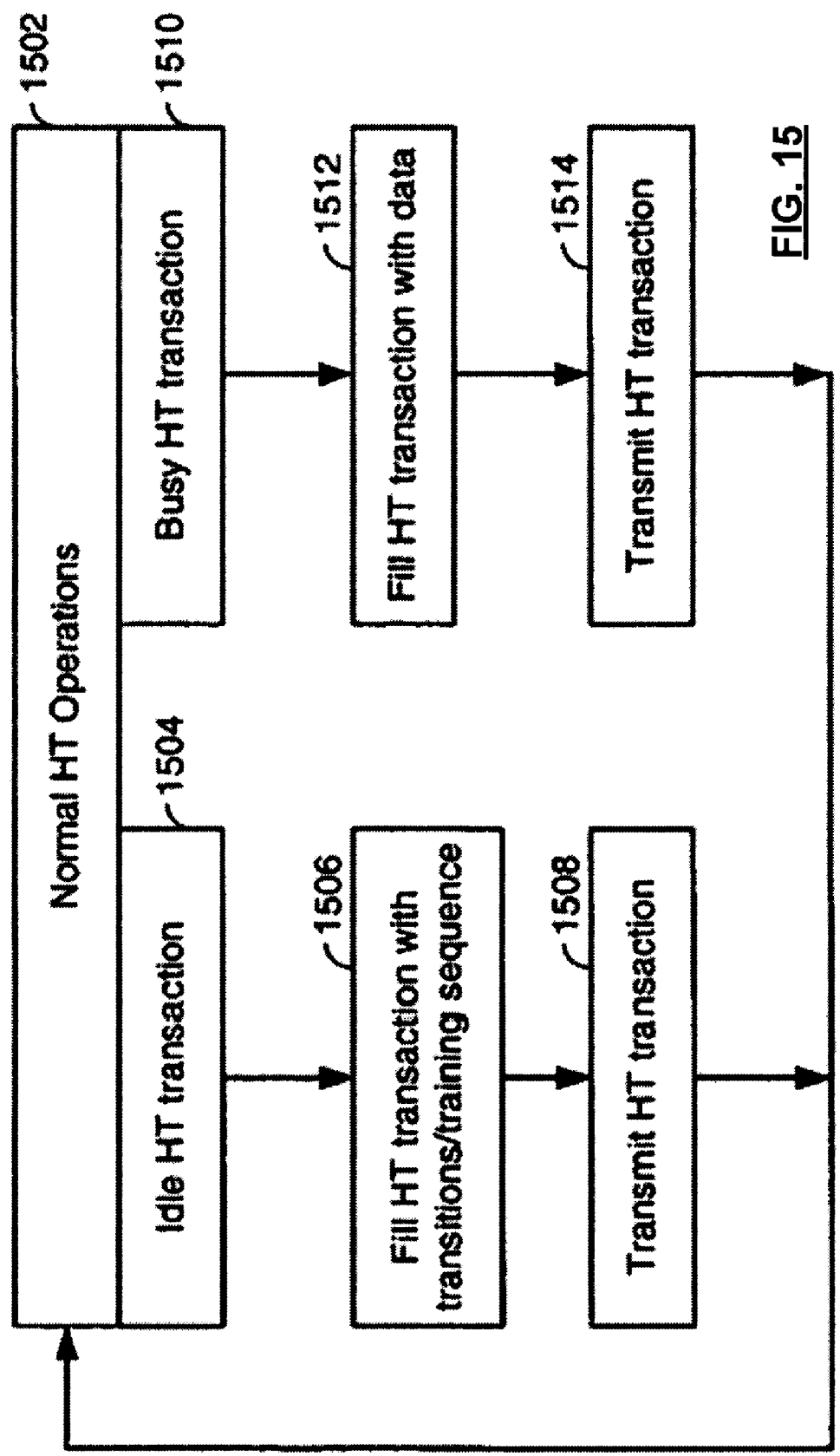

HYPERTRANSPORT/SPI-4 INTERFACE SUPPORTING CONFIGURABLE DESKEWING

CROSS REFERENCE TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:
1. U.S. Utility Application Ser. No. 10/742,060, entitled "Hypertransport/SPI-4 Interface Supporting Configurable Deskewing," filed Dec. 20, 2003, now issued as U.S. Pat. No. 7,490,187, on Feb. 10, 2009, which claims priority pursuant to 35 U.S.C. §120, as a continuation-in-part, to the following U.S. Utility Patent Application:
2. U.S. Utility Application Ser. No. 10/356,390, entitled "Multiple Processor Integrated Circuit having Configurable Pack-Based Interfaces," filed Jan. 31, 2003, abandoned, which claims priority pursuant to 35 U.S.C. §119(e) to the following U.S. Provisional Patent Application which is hereby incorporated herein by reference in its entirety and made part of the present U.S. Utility Patent Application for all purposes:
  (a) U.S. Provisional Patent Application No. 60/380,740, entitled "Multiple Processor Integrated Circuit having Configurable Packet-Based Interfaces", filed May 15, 2002, expired; and
  (b) U.S. Provisional Patent Application No. 60/419,032, entitled "Multiple Processor Integrated Circuit having Configurable Packet-Based Interfaces", filed Oct. 16, 2002, expired.

BACKGROUND

1. Technical Field

The present invention relates generally to data communications and more particularly to high-speed wired data communications.

2. Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, for example, PCI (Peripheral Component Interface) bus, ISA (Industry Standard Architecture) bus, an USB (Universal Serial Bus), SPI (System Packet Interface, such as SPI-4) among others.

One relatively new communication technology used in coupling relatively small groups of devices is the HyperTransport (HT) technology, previously known as the Lightning Data Transport (LDT) technology (HyperTransport I/O Link Specification "HT Standard"). The HT Standard sets forth definitions for a high-speed, low-latency protocol that can interface with today's buses like AGP, PCI, SPI, 1394, USB 2.0, and 1 Gbit Ethernet as well as next generation buses including AGP 8x, Infiniband, PCI-X, PCI 3.0, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

Many communication devices often require significant processing capabilities and significant memory capacity. These communication devices therefore may employ one or more integrated circuits having multiple processors, memory, a processor bus, and interface ports formed therein. An integrated circuit of this type is often referred to as a "System On a Chip" (SOC). Network switches, web servers, and other high capacity devices often require more processing and storage capacity than can be provided by a single SOC. Thus, these devices often include a plurality of SOCs mounted upon a single Printed Circuit Board (PCB) and/or include multiple PCBs each having mounted thereon one or more SOCs. In these instances, the PCBs may be rack mounted and may intercouple via a back plane of the rack. The SOCs on the PCBs couple via traces formed on the PCBs.

Because of the high data rates that it supports, the HT Standard is popular for coupling devices, such as SOCs. The HT Standard, however, has very tight skew requirements. Coupling HT enabled devices via a backplane connection or even via long traces on a Printed Circuit Board, i.e., low quality connections, would violate the HT Standard in many operations. Thus, relatively lower data rate interfaces, e.g., SPI-4, are typically employed across the back plane and/or across long traces.

Therefore, a need exists for methods and/or apparatuses for interfacing devices using the high speed HT interface standard via relatively low quality connections.

SUMMARY

The present invention is directed to apparatus and methods of operation that are further described in the following Brief Description of the Drawings, the Detailed Description of the Drawings, and the Claims. Other features and advantages of the present invention will become apparent from the following detailed description of the invention made with reference to the accompanying drawings.

BRIEF DESCRIPTION OF THE DRAWINGS

FIG. 15 is a flow diagram illustrating a method for filling HT transactions with transition rich data employed to maintain synchronization of deskew circuitry by a receiving HT device according to an embodiment of the present invention.

DETAILED DESCRIPTION OF THE DRAWINGS

Figure 1:
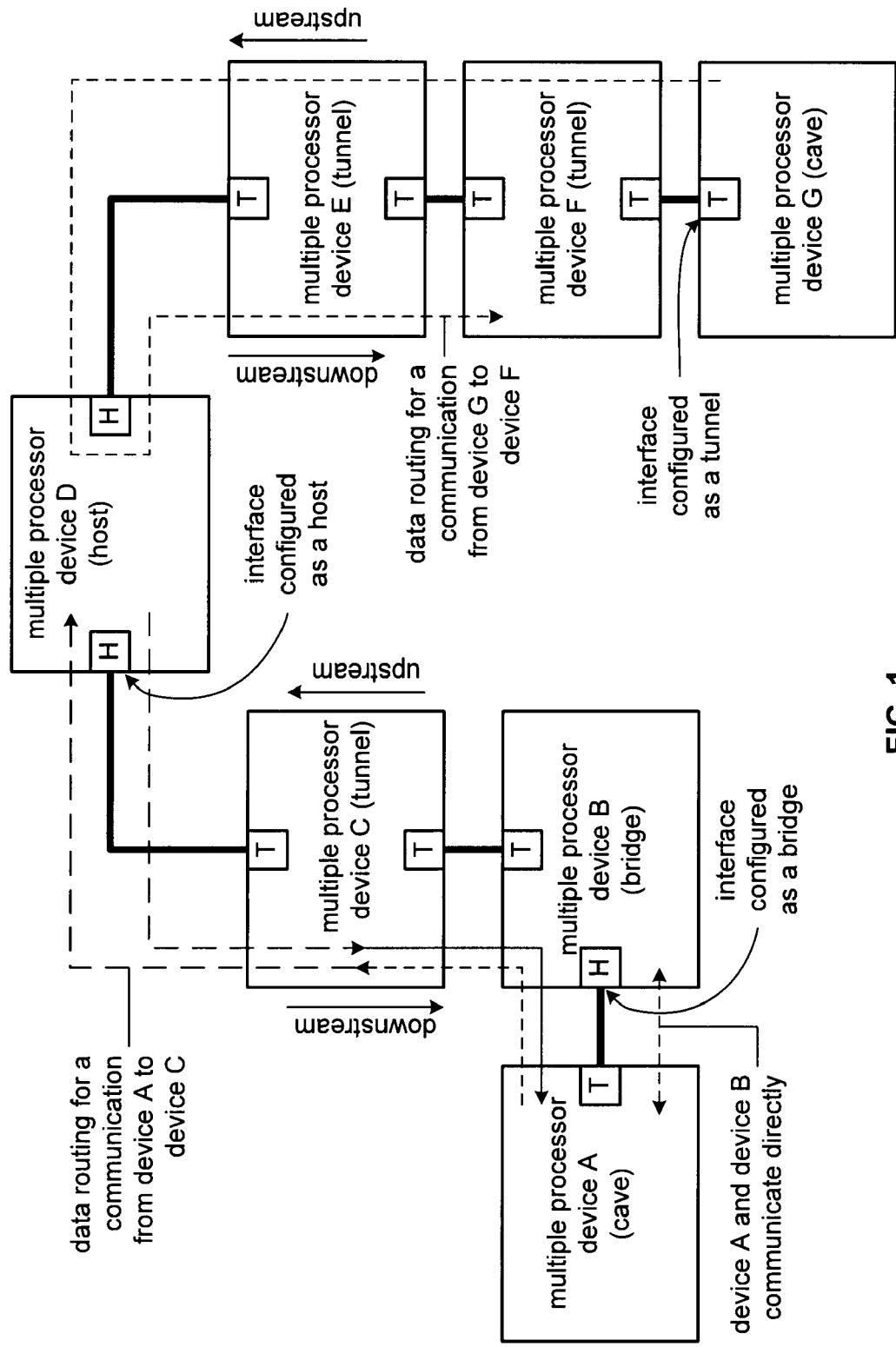
FIG. 1 is a schematic block diagram of a processing system in accordance with the present invention.

In order to overcome the above-described shortcomings as well as other shortcomings of the prior devices, a dual mode digital interface supports the HyperTransport Standard and at least one other interface standard. The dual mode digital interface includes a physical interface, a plurality of data line amplifiers, a clock line amplifier, a plurality of data line deskew/sampling blocks, a data group deskew module, and an enablement control module.

The physical interface is operable to couple to a servicing media that includes a physical line for each of a plurality of data lines and a clock line. The plurality of data line amplifiers communicatively couple to the physical interface and are operable to amplify incoming data received on the plurality of data lines. The clock line amplifier communicatively couples to the physical interface and is operable to amplify a clock signal received on the clock line. The plurality of data line deskew/sampling blocks communicatively couple to the plurality of data line amplifiers and are operable to deskew and sample incoming data on respective data lines based upon the clock signal to produce deskewed data.

The data group deskew module communicatively couples to the plurality of data line deskew/sampling blocks, is operable to receive deskewed data from each of the plurality of data line deskew/sampling blocks, and is operable to remove inter-data line skew from the deskewed data to produce received data. The enablement control module is operable to disable the plurality of data line deskew/sampling blocks and/or the data group deskew module when supporting one aspect of the HyperTransport Standard and to optionally enable the plurality of data line deskew/sampling blocks and/or the data group deskew module when supporting the at least one other interface standard.

The enablement control module is operable to enable the plurality of data line deskew/sampling blocks and the data group deskew module when operating according to a second portion of the HyperTransport Standard having second skew tolerances that are less stringent than the first skew tolerances. Thus, while the HyperTransport Standard may, or may not expressly support the less stringent skew tolerances, the dual mode digital interface corrects the greater skew caused by a relatively lower quality servicing media to therefore support greater data rates.

The plurality of data line deskew/sampling blocks and the data group deskew module may be set based upon a training sequence received from a link partner. The training sequence may received during startup or reset, immediately after startup or reset completes, or may be received periodically during idle periods. For example, the training sequence may be received during assertion of a HyperTransport reset signal on the servicing media, immediately after de-assertion of a HyperTransport reset signal on the servicing media, periodically during a training interval, or during a HyperTransport CRC ("Cyclic Redundancy Check") testing mode.

A digital interface constructed according to the present invention supports the HyperTransport Standard and includes similar components, as does the dual mode digital interface. However, the digital interface support the HT Standard but does not support the differing standard. With the digital interface, the plurality of data line deskew/sampling blocks and/or the data group deskew module are set with deskew settings determined based upon a training sequence received from a link partner. This training sequence may be received as described above. With either device, idle HyperTransport transactions, instead of being empty, carry transition rich data.

Other features and advantages of the present invention will become apparent from the following detailed description of the invention made with reference to the accompanying drawings.

FIG. 1 is a schematic block diagram of a processing system 10 that includes a plurality of multiple processor devices A-G. Each of the multiple processor devices A-G include at least two interfaces, which in this illustration are labeled as T for tunnel functionality or H for host or bridge functionality. The details of the multiple processor devices A-G will be described in detail with reference to FIG. 4.

In this example of a processing system 10, multiple processor device D is functioning as a host to support two primary chains. The 1st primary chain includes multiple processor device C, which is configured to provide a tunnel function, and multiple processor device B, which is configured to provide a bridge function. The other primary chain supported by device D includes multiple processor devices E, F, and G, which are each configured to provide tunneling functionality. The processing system 10 also includes a secondary chain that includes multiple processor devices A and B, where device A is configured to provide a tunneling function. Multiple processor device B functions as the host for the secondary chain. By convention, data from the devices (i.e., nodes) in a chain to the host device is referred to as downstream data and data from the host device to the node devices is referred to as upstream data.

In general, when a multiple processor device is providing a tunneling function, it passes, without interpretation, all packets received from downstream devices (i.e., the multiple processor devices that, in the chain, are further away from the host device) to the next upstream device (i.e., an adjacent multiple processor device that, in the chain, is closer to the host device). For example, multiple processor device E provides all downstream packets received from downstream multiple processor devices F and G to host device D without interpretation, even if the packets are addressing multiple processor device F or G. The host device modifies the downstream packets to identify itself as the source of downstream packets and sends the modified packets upstream along with any packets that it generated. As the multiple processor devices receive the upstream packets, they interpret the packet to identify the host device as the source and to identify a destination. If the multiple processor device is not the destination, it passes the upstream packets to the next downstream node. For example, packets received from the host device D that are directed to the multiple processor device E will be processed by the multiple processor device E, but device E will pass packets for devices F and G. The processing of packets by device E includes routing the packets to a particular processing unit within device E, routing to local memory, routing to external memory associated with device E, et cetera.

In this configuration, if multiple processor device G desires to send packets to multiple processor device F, the packets would traverse through devices E and F to host device D. Host device D modifies the packets identifying the multiple processor device D as the source of the packets and provide the modified packets to multiple processor device E, which would in turn forward them to multiple processor device F. A similar type of processing occurs between multiple processor device B and multiple processor device C, between devices G and E, and between devices E and F.

For the secondary chain, devices A and B can communication directly, i.e., they support peer-to-peer communications therebetween. In this instance, the multiple processor device B has one of its interfaces (H) configured to provide a bridge function. According, the bridge functioning interface of device B interprets packets it receives from device A to determine the destination of the packet. If the destination is local to device B (i.e., meaning the destination of the packet is one of the modules within multiple processor device B or associated with multiple processor device B), the H interface processes the received packet. The processing includes forwarding the packet to the appropriate destination within, or associated with, device B.

If the packet is not destined for a module within device B, multiple processor device B modifies the packet to identify itself as the source of the packets. The modified packets are then forwarded to the host device D via device C, which is providing a tunneling function. For example, if device A desires communication with device C, device A provides packets to device B and device B modifies the packets to identify device B as the source of the packets. Device B then provides the modified packets to host device D via device C. Host device D then, in turn, modifies the packets to identify itself as the sources of the packets and provides the again modified packets to device C, where the packets are subsequently processed. Conversely, if device C were to transmit packets to device A, the packets would first be sent to host D, modified by device D, and the modified packets would be provided back to device C. Device C, in accordance with the tunneling function, passes the packets to device B. Device B interprets the packets, identifies device A as the destination, and modifies the packets to identify device B as the source. Device B then provides the modified packets to device A for processing thereby.

In the processing system 10, device D, as the host, assigns a node ID (identification code) to each of the other multiple processor devices in the system. Multiple processor device D then maps the node ID to a unit ID for each device in the system, including its own node ID to its own unit ID. Accordingly, by including a bridging functionality in device B, in accordance with the present invention, the processing system 10 allows for interfacing between devices using one or more communication protocols and may be configured in one or more configurations while overcoming bandwidth limitations, latency limitations and other limitations associated with the use of high speed HyperTransport chains.

As one of average skill in the art will appreciate, the particular protocol for data transmission between devices may be in accordance with a HyperTransport protocol, system packet interface (SPI) protocol, e.g., SPI-4 Standard, and/or other types of packet-switched or circuit-switched protocols.

Figure 2:
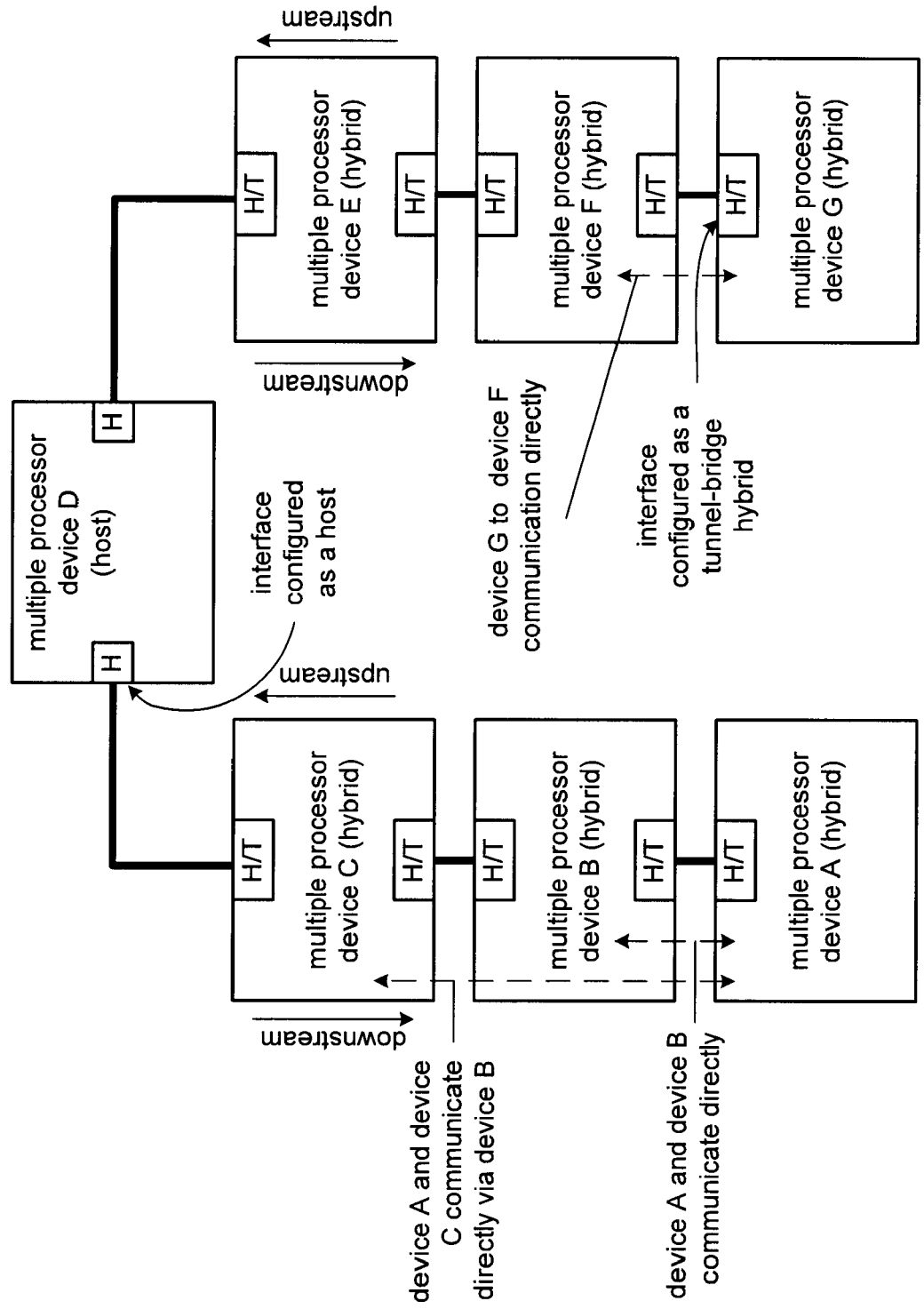
FIG. 2 is a schematic block diagram of an alternate processing system in accordance with the present invention.
Figure 4:
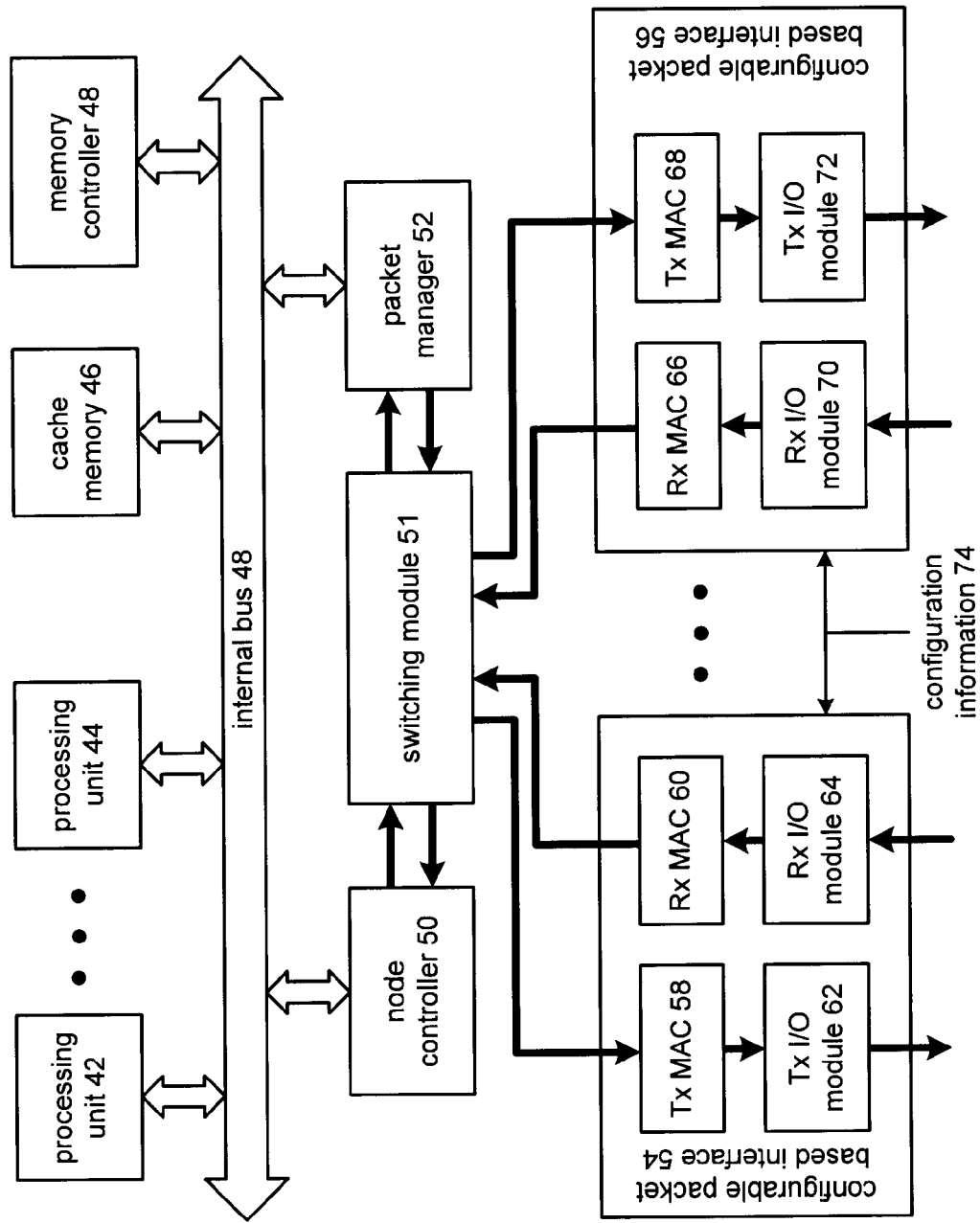
FIG. 4 is a schematic block diagram of a multiple processor device in accordance with the present invention.

FIG. 2 is a schematic block diagram of an alternate processing system 20 that includes a plurality of multiple processor devices A-G. In this system 20, multiple processor device D is the host device while the remaining devices are configured to support a tunnel-bridge hybrid interfacing functionality. Each of multiple processor devices A-C and E-G have their interfaces configured to support the tunnel-bridge hybrid (H/T) mode. With the interfacing configured in this manner, peer-to-peer communications may occur between multiple processor devices in a chain. For example, multiple processor device A may communicate directly with multiple processor device B and may communicate with multiple processor device C, via device B, without routing packets through the host device D. For peer-to-peer communication between devices A and B, multiple processor device B interprets the packets received from multiple processor device A to determine whether the destination of the packet is local to multiple processor device B. With reference to FIG. 4, a destination associated with multiple processor device B may be anyone of the processing units 42-44, cache memory 46 or system memory accessible through the memory controller 48. Returning to the diagram of FIG. 2, if the packets received from device A are destined for a module within device B, device B processes the packets by forwarding them to the appropriate module within device B. If the packets are not destined for device B, device B forwards them, without modifying the source of the packets, to multiple processor device C.

The packets received by multiple processor device C are interpreted to determine whether a module within multiple processor device C is the destination of the packets. If so, device C processes them by forwarding the packets to the appropriate module within, or associated with, device C. If the packets are not destined for a module within device C, device C forwards them to the multiple processor device D. Device D modifies the packets to identify itself as the source of the packets and provides the modified packets to the chain including devices E-G. Devices E-G, in order, interpret the modified packets to determine whether it is a destination of the modified packets. If so, the device processes the packets. If not, the device routes the packets to the next device in chain. In addition, devices E-G support peer-to-peer communications in a similar manner as devices A-C. Accordingly, by configuring the interfaces of the devices to support a tunnel-bridge hybrid function, the source of the packets is not modified (except when the communications are between primary chains of the system), which enables the devices to use one or more communication protocols (e.g., HyperTransport, system packet interface, et cetera) in a peer-to-peer configuration that substantially overcomes the bandwidth limitations, latency limitations and other limitations associated with the use of a conventional high-speed HyperTransport chain.

Figure 3:
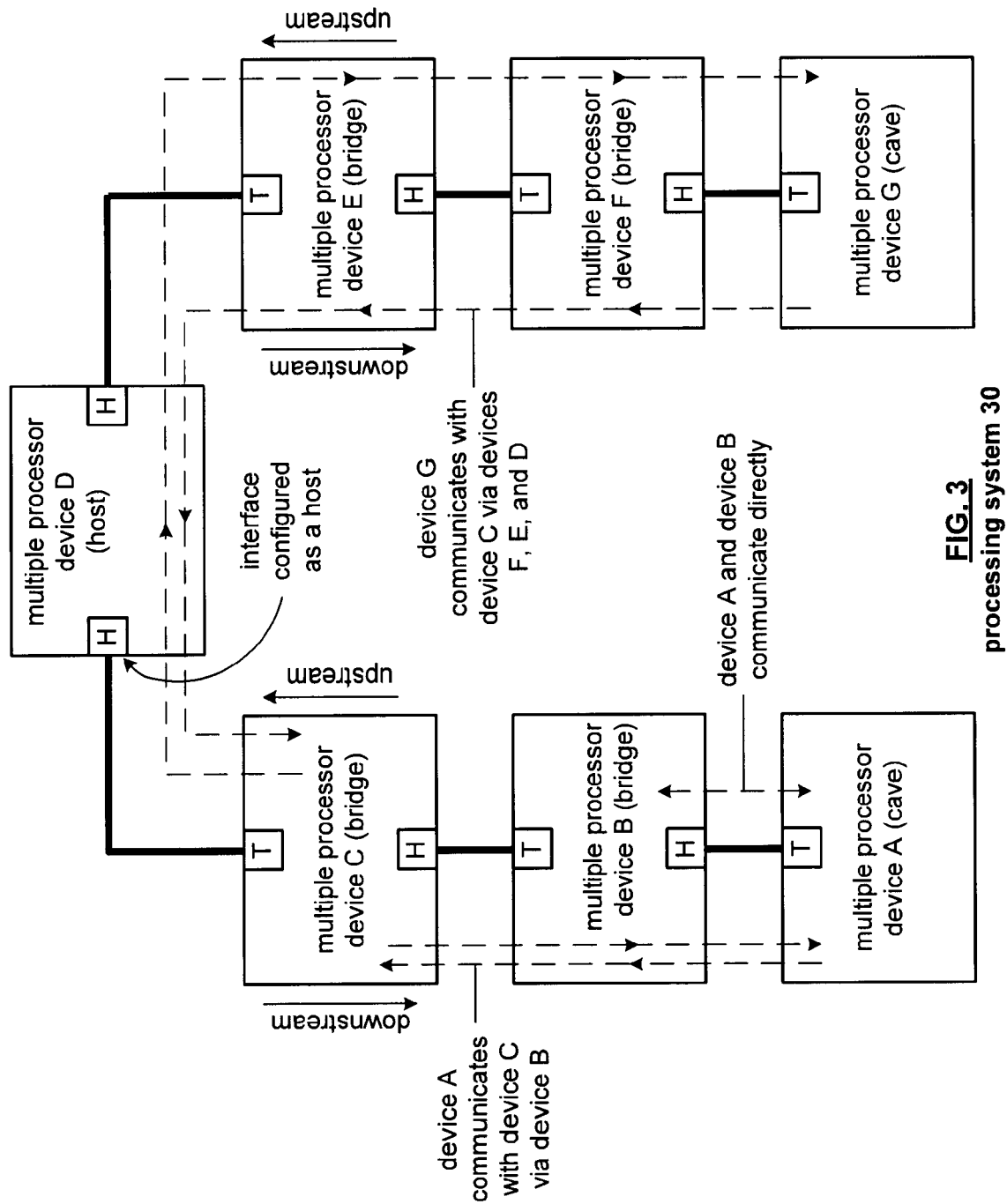
FIG. 3 is a schematic block diagram of another processing system in accordance with the present invention.

FIG. 3 is a schematic block diagram of processing system 30 that includes multiple processor devices A-G. In this embodiment, multiple processor device D is functioning as a host device for the system while the remaining multiple processor devices A-C and E-G are configured to support a bridge functionality. In this configuration, each of the devices may communicate directly (i.e., have peer-to-peer communication) with adjacent multiple processor devices via cascaded secondary chains. For example, device A may directly communicate with device B via a secondary chain therebetween, device B with device C via a secondary chain therebetween, device E with device F via a secondary chain therebetween, and device F with device G via a secondary chain therebetween. The primary chains in this example of a processing system exist between device D and device C and between device D and device E.

For communication between devices A and B, device B interprets packets received from device A to determine their destination. If device B is the destination, it processes it by providing it to the appropriate destination within, or associated with, device B. If the packet is not destined for device B, device B modifies the packet to identify device B as the source and forwards it to device C. Accordingly, if device A desires to communicate with device B, it does so via device B. However, for device A to communicate with device C, device B, as the host for the chain between devices A and B, modifies the packets to identify itself as the source of the packets. The modified packets are then routed to device C. To device C, the packets appear to be coming from device B and not device A. For packets from device C to device A, device B modifies the packets to identify itself as the source of the packets and provides the modified packets to device A. In such a configuration, each device only knows that it is communicating with one device in the downstream direct and one device in the upstream direction. As such, peer-to-peer communication is supported directly between adjacent devices and is also supported indirectly (i.e., by modifying the packets to identify the host of the secondary chain as the source of the packets) between any devices in the system.

In any of the processing systems illustrated in FIGS. 1-3, the devices on one chain may communicate with devices on the other chain. An example of this is illustrated in FIG. 3 where device G may communicate with device C. As shown, packets from device G are propagated through devices D, E and F until they reach device C. Similarly, packets from device C are propagated through devices D, E and F until they reach device G. In the example of FIG. 3, the packets in the downstream direction and in the upstream direction are adjusted to modify the source of the packets. Accordingly, packets received from device G appear, to device C, to be originated by device D. Similarly, packets from device C appear, to device G, to be sourced by device F. As one of average skill in the art will appreciate, each devices that is providing a host function or a bridge function maintains a table of communications for the chains it is the host to track the true source of the packets and the true destination of the packets.

FIG. 4 is a schematic block diagram of a multiple processor device 40 in accordance with the present invention. The multiple processor device 40 may be an integrated circuit or it may be comprised of discrete components. In either implementation, the multiple processor device 40 may be used as multiple processor device A-G in the processing systems illustrated in FIGS. 1-3.

The multiple processor device 40 includes a plurality of processing units 42-44, cache memory 46, memory controller 48, which interfaces with on and/or off-chip system memory, an internal bus 48, a node controller 50, a switching module 51, a packet manager 52, and a plurality of configurable packet based interfaces 54-56 (only two shown). The processing units 42-44, which may be two or more in numbers, may have a MIPS based architecture, to support floating point processing and branch prediction. In addition, each processing unit 42, 44 may include a memory sub-system of an instruction cache and a data cache and may support separately, or in combination, one or more processing functions. With respect to the processing system of FIGS. 1-3, each processing unit 42 or 44 may be a destination within multiple processor device 40 and/or each processing function executed by the processing modules 42-44 may be a destination within the processor device 40.

The internal bus 48, which may be a 256 bit cache line wide split transaction cache coherent orientated bus, couples the processing units 42-44, cache memory 46, memory controller 48, node controller 50 and packet manager 52 together. The cache memory 46 may function as an L2 cache for the processing units 42-44, node controller 50 and/or packet manager 52. With respect to the processing system of FIGS. 1-3, the cache memory 46 may be a destination within multiple processor device 40.

The memory controller 48 provides an interface to system memory, which, when the multiple processor device 40 is an integrated circuit, may be off-chip and/or on-chip. With respect to the processing system of FIGS. 1-3, the system memory may be a destination within the multiple processor device 40 and/or memory locations within the system memory may be individual destinations within the device 40. Accordingly, the system memory may include one or more destinations for the processing systems illustrated in FIGS. 1-3.

The node controller 50 functions as a bridge between the internal bus 48 and the configurable packet-based interfaces 54-56. Accordingly, accesses originated on either side of the node controller will be translated and sent on to the other. The node controller also supports the distributed shared memory model associated with the cache coherency non-uniform memory access (CC-NUMA) protocol.

The switching module 51 couples the plurality of configurable packet-based interfaces 54-56 to the node controller 50 and/or to the packet manager 52. The switching module 51 functions to direct data traffic, which may be in a generic format, between the node controller 50 and the configurable packet-based interfaces 54-56 and between the packet manager 52 and the configurable packet-based interfaces 54. The generic format may include 8 byte data words or 16 byte data words formatted in accordance with a proprietary protocol, in accordance with asynchronous transfer mode (ATM) cells, in accordance internet protocol (IP) packets, in accordance with transmission control protocol/internet protocol (TCP/IP) packets, and/or in general, in accordance with any packet-switched protocol or circuit-switched protocol.

The packet manager 52 may be a direct memory access (DMA) engine that writes packets received from the switching module 51 into input queues of the system memory and reads packets from output queues of the system memory to the appropriate configurable packet-based interface 54-56. The packet manager 52 may include an input packet manager and an output packet manager each having its own DMA engine and associated cache memory. The cache memory may be arranged as first in first out (FIFO) buffers that respectively support the input queues and output queues.

The configurable packet-based interfaces 54-56 generally function to convert data from a high-speed communication protocol (e.g., HT, SPI, etc.) utilized between multiple processor devices 40 and the generic format of data within the multiple processor devices 40. Accordingly, the configurable packet-based interface 54 or 56 may convert received HT or SPI packets into the generic format packets or data words for processing within the multiple processor device 40. In addition, the configurable packet-based interfaces 54 and/or 56 may convert the generic formatted data received from the switching module 51 into HT packets or SPI packets. The particular conversion of packets to generic formatted data performed by the configurable packet-based interfaces 54 and 56 is based on configuration information 74, which, for example, indicates configuration for HT to generic format conversion or SPI to generic format conversion.

Each of the configurable packet-based interfaces 54-56 includes a media access controller (MAC) 58 or 68, a receiver MAC 60 or 66, a transmitter input/output module 62 or 72, and a receiver input/output module 64 or 70. In general, the transmit MAC module 58 or 68 functions to convert outbound data of a plurality of virtual channels in the generic format to a stream of data in the specific high-speed communication protocol (e.g., HT, SPI, etc.) format. The transmit I/O module 62 or 72 generally functions to drive the high-speed formatted stream of data onto the physical link coupling the present multiple processor device 40 to another multiple processor device. The transmit I/O module 62 or 72 is further described, and hereby incorporated herein by reference, in co-pending patent application Ser. No. 10/305,648, entitled MULTI-FUNCTION INTERFACE AND APPLICATIONS THEREOF, filed Nov. 27, 2002, now issued as U.S. Pat. No. 6,809,547 on Oct. 26, 2004. The receive MAC module 60 or 66 generally functions to convert the received stream of data from the specific high-speed communication protocol (e.g., HT, SPI, etc.) format into data from a plurality of virtual channels having the generic format. The receive I/O module 64 or 70 generally functions to amplify and time align the high-speed formatted steam of data received via the physical link coupling the present multiple processor device 40 to another multiple processor device. The receive I/O module 64 or 70 is further described with reference to FIGS. 6-8.

The transmit and/or receive MACs 58, 60, 66 and/or 68 may include, individually or in combination, a processing module and associated memory to perform its correspond functions. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory stores, and the processing module executes, operational instructions corresponding to the functionality performed by the transmitter MAC 58 or 68.

In operation, the configurable packet-based interfaces 54-56 provide the means for communicating with other multiple processor devices 40 in a processing system such as the ones illustrated in FIG. 1, 2 or 3. The communication between multiple processor devices 40 via the configurable packet-based interfaces 54 and 56 is formatted in accordance with a particular high-speed communication protocol (e.g., Hyper-Transport (HT) or system packet interface (SPI)). The configurable packet-based interfaces 54-56 may be configured to support, at a given time, one or more of the particular high-speed communication protocols. In addition, the configurable packet-based interfaces 54-56 may be configured to support the multiple processor device 40 in providing a tunnel function, a bridge function, or a tunnel-bridge hybrid function.

When the multiple processor device 40 is configured to function as a tunnel-hybrid node, the configurable packet-based interface 54 or 56 receives the high-speed communication protocol formatted stream of data and separates, via the MAC module 60 or 68, the stream of incoming data into generic formatted data associated with one or more of a plurality a particular virtual channels. The particular virtual channel may be associated with a local module of the multiple processor device 40 (e.g., one or more of the processing units 42-44, the cache memory 46 and/or memory controller 48) and, accordingly, corresponds to a destination of the multiple processor device 40 or the particular virtual channel may be for forwarding packets to the another multiple processor device.

The interface 54 or 56 provides the generically formatted data words, which may comprise a packet or portion thereof, to the switching module 51, which routes the generically formatted data words to the packet manager 52 and/or to node controller 50. The node controller 50, the packet manager 52 and/or one or more processing units 42-44 interprets the generically formatted data words to determine a destination therefor. If the destination is local to multiple processor device 40 (i.e., the data is for one of processing units 42-44, cache memory 46 or memory controller 48), the node controller 50 and/or packet manager 52 provides the data, in a packet format, to the appropriate destination. If the data is not addressing a local destination, the packet manager 52, node controller 50 and/or processing unit 42-44 causes the switching module 51 to provide the packet to one of the other configurable packet-based interfaces 54 or 56 for forwarding to another multiple processor device in the processing system. For example, if the data were received via configuration packet-based interface 54, the switching module 51 would provide the outgoing data to configurable packet-based interface 56. In addition, the switching module 51 provides outgoing packets generated by the local modules of processing module device 40 to one or more of the configurable packet-based interfaces 54-56.

The configurable packet-based interface 54 or 56 receives the generic formatted data via the transmitter MAC module 58 or 68. The transmitter MAC module 58, or 68 converts the generic formatted data from a plurality of virtual channels into a single stream of data. The transmitter input/output module 62 or 72 drives the stream of data on to the physical link coupling the present multiple processor device to another.

When the multiple processor device 40 is configured to function as a tunnel node, the data received by the configurable packet-based interfaces 54 from a downstream node is routed to the switching module 51 and then subsequently routed to another one of the configurable packet-based interfaces for transmission downstream without interpretation. For upstream transmissions, the data is interpreted to determine whether the destination of the data is local. If not, the data is routed upstream via one of the configurable packet-based interfaces 54 or 56.

When the multiple processor device 40 is configured as a bridge node, downstream packets that are received via a configurable packet-based interface 54 are modified via the packet manager 52, the node controller 54 and/or processing units 42-44 to identify the current multiple processor device 40 as the source of the data. Having modified the source, the switching module 51 provides the modified data to one of the configurable packet-based interfaces for transmission downstream. For upstream transmissions, the multiple processor device 40 interprets the data to determine whether it contains the destination for the data. If so, the data is routed to the appropriate destination. If not, the multiple processor device 40 forwards the packet via one of the configurable packet-based interfaces 54 or 56 to a downstream device.

To determine the destination of the data, the node controller 50, the packet manager 52 and/or one of the processing units 42 or 44 interprets header information of the data to identify the destination. In addition, a set of ordering rules of the received data is applied when processing the data, where processing includes forwarding the data, in packets, to the appropriate local destination or forwarding it onto another device. The ordering rules include the ordering rules as defined in the HT specification as well as non-posted commands are issued in order of reception. The rules further include that the interfaces are aware of whether they are configured to support a tunnel, bridge, or tunnel-bridge hybrid node. With such awareness, for every ordered pair of transactions, the receiver portion of the interface will not make a new ordered pair visible to the switching module until the old ordered pair has been sent to the switching module. The node controller, in addition to adhering to the HT specified ordering rules, treats all HT transactions as being part of the same input/output stream, regardless of which interface the transactions was received from. Accordingly, by applying the appropriate ordering rules, the routing to and from the appropriate destinations either locally or remotely is accurately achieved.

Figure 5:
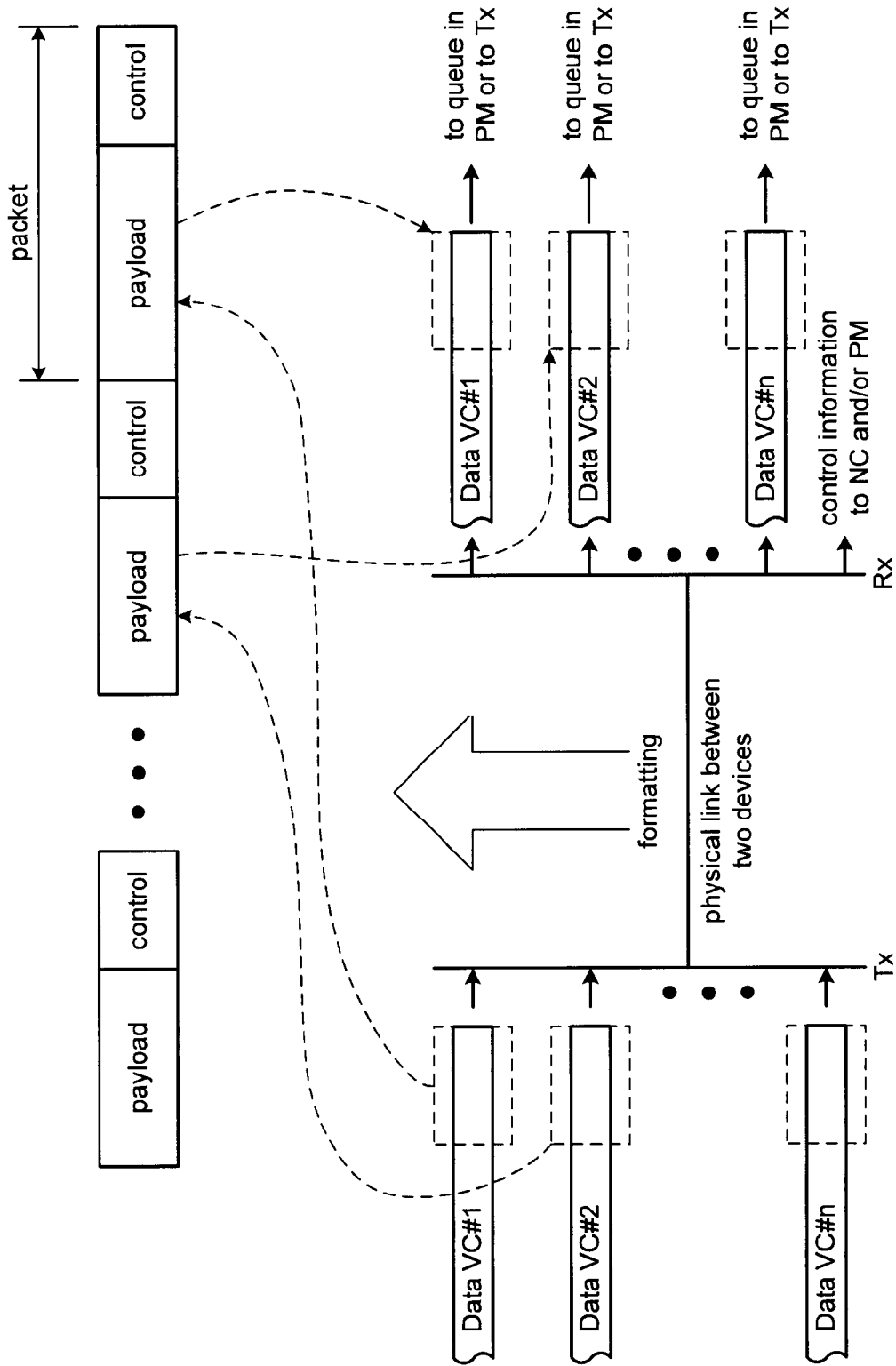
FIG. 5 is a graphical representation of transporting data between devices in accordance with the present invention.

FIG. 5 is a graphical representation of the functionality performed by a combination of the node controller 50, the switching module 51, the packet manager 52 and/or the configurable packet-based interfaces 54 and 56. In this illustration, data is transmitted over a physical link between two devices in accordance with a particular high-speed communication protocol (e.g., HT, SPI-4, etc.). Accordingly, the physical link supports a protocol that includes a plurality of packets. Each packet includes a data payload and a control section. The control section may include header information regarding the payload, control data for processing the corresponding payload, and/or control data for system administration functions.

Within a multiple processor device, a plurality of virtual channels may be established. A virtual channel may correspond to a particular physical entity, such as processing units 42, 44, cache memory 46 and/or memory controller 48, and/or to a logical entity such as a particular algorithm being executed by processing module 42 or 44, particular memory locations within cache memory 46 and/or particular memory locations within system memory accessible via the memory controller 48. In addition, one or more virtual channels may correspond to data packets received from downstream or upstream nodes that require forwarding. Accordingly, each multiple processor device supports a plurality of virtual channels. The data of the virtual channels, which is illustrated as data virtual channel number 1 (VC#1), virtual channel number 2 (VC#2) through virtual channel number N (VC#n) may have a generic format. The generic format may be 8 byte data words, 16 byte data words that correspond to a proprietary protocol, ATM cells, IP packets, TCP/IP packets, other packet switched protocols and/or circuit switched protocols.

As illustrated, a plurality of virtual channels is sharing the physical link between the two devices. The multiple processor device 40, via one of the processing units 42-44, node controller 50 and/or packet manager 52 manages the allocation of the physical link among the plurality of virtual channels. As shown, the payload of a particular packet may be loaded with a segment of a virtual channel. In this illustration, the 1st packet includes a segment, or fragment, of virtual channel number 1. The data payload of the next packet receives a segment, or fragment, of virtual channel number 2. The allocation of virtual channels to packets may be done in a round-robin fashion, a weighted round-robin fashion or some other application of fairness to access the physical link. The data transmitted across the physical link may be in a serial format and at extremely high data rates (e.g., 3.125 gigabits-per-second or greater).

At the receiving device, the serial stream of data is received and then separated into the corresponding virtual channels via the configurable packet-based interface, the switching module 51, the node controller 50 and/or packet manager 52. The recaptured virtual channel data is either provided to an input queue for a local destination or provided to an output queue for forwarding via one of the configurable packet-based interfaces to another device. Accordingly, each of the devices in a processing system as illustrated in FIGS. 1-3 may utilize a high speed serial interface, or plurality of high speed serial interfaces, to transceive data from a plurality of virtual channels utilizing one or more communication protocols and be configured in one or more configurations while substantially overcoming the bandwidth limitations, latency limitations and other limitations associated with the use of a high speed HyperTransport chain.

Figure 6:
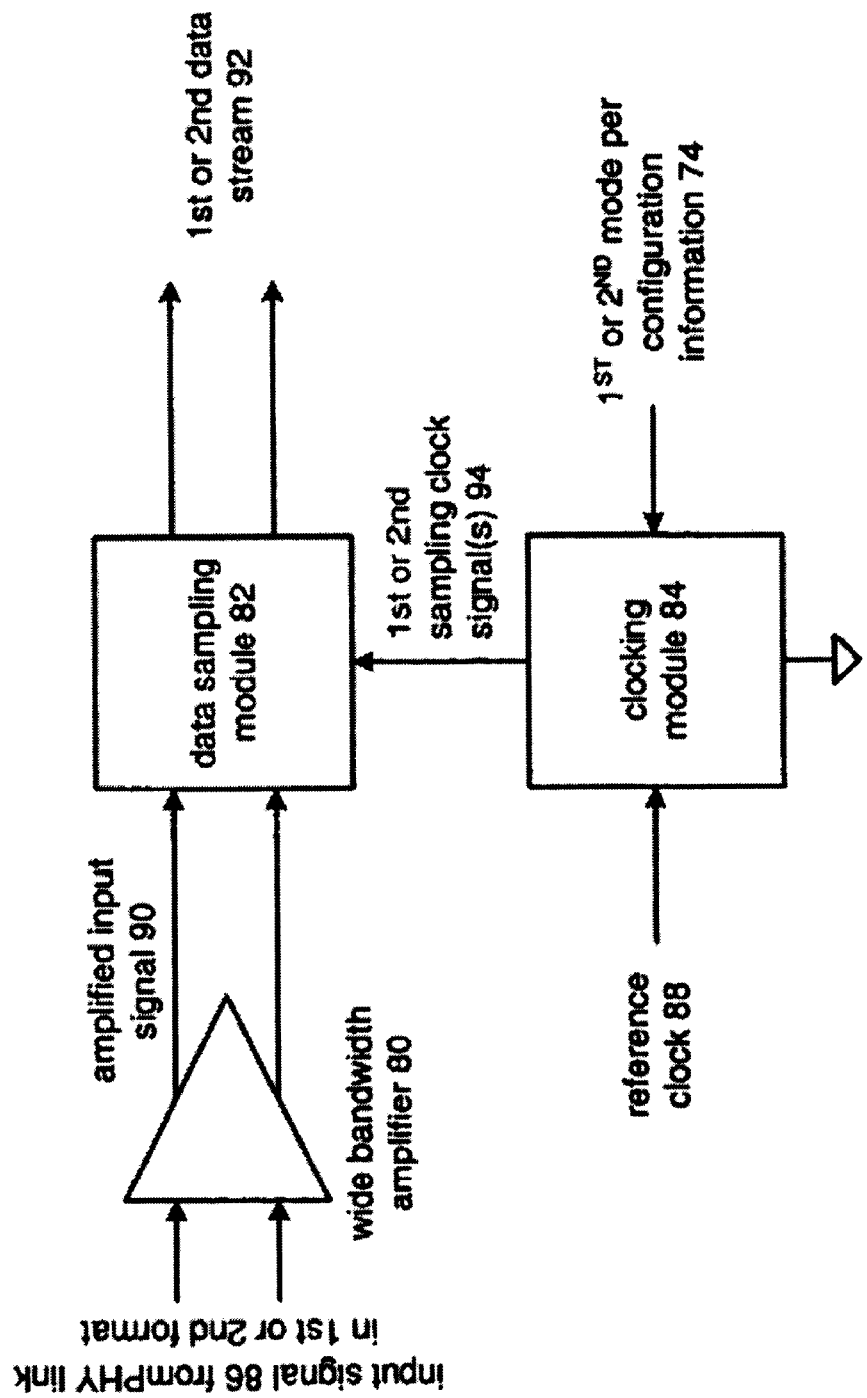
FIG. 6 is a schematic block diagram of a receiver multifunction input/output interface module in accordance with the present invention.

FIG. 6 is a schematic block diagram of a receiver input/output module 64 and/or 70 that includes a wide bandwidth amplifier 80, a data sampling module 82 and a clocking module 84. The receiver input/output module 64 and/or 70 receives, via the physical link coupling the current multiple processor device to another, the input signal 86 and the reference clock 88. The wide bandwidth amplifier 80 produces an amplified input signal 90. The input signal 86 may be in the 1st or 2nd format, but in either case, the input signal 86 is amplified by the wide bandwidth amplifier 80 to produce the amplified input signal 90.

The clocking module 84 generates a 1st or 2nd sampling clock signals 94 from the reference clock 88. In particular, clocking module 84 generates the 1st sampling clock signals 94 from the reference clock 88 when the configuration information 74 indicates the 1st mode of operation. Conversely, the clocking module 84 generates the 2nd sampling clock signals 94 from the reference clock 88 when the configuration information 74 indicates the 2nd mode of operation. The data sampling module 82 samples the amplified input signal 90 in accordance with the 1st or 2nd sampling clock signals 94 to produce the 1st or 2nd data stream 92.

Figure 7:
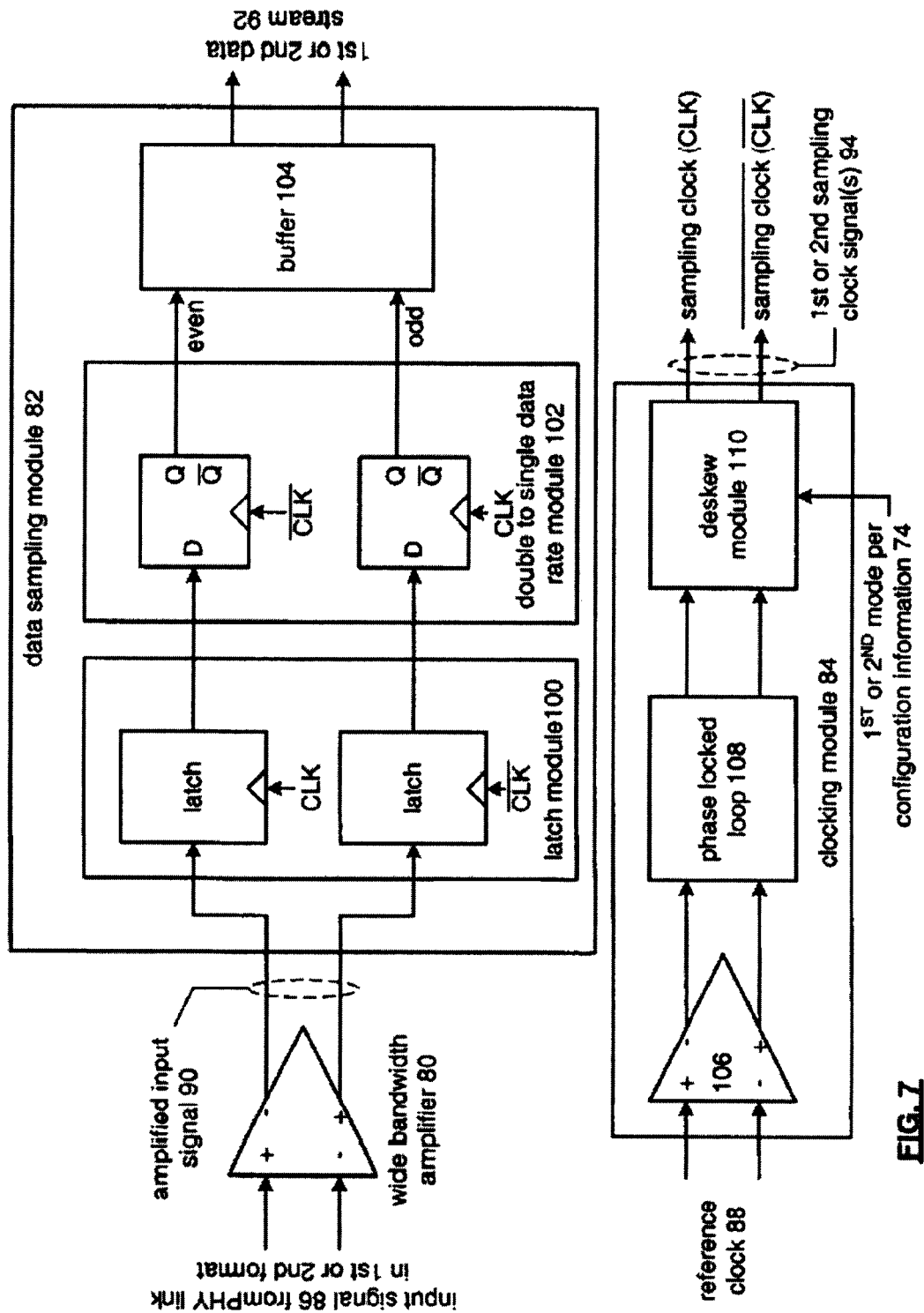
FIG. 7 is a schematic block diagram of an alternate receiver input/output interface module in accordance with the present invention.

FIG. 7 illustrates a more detailed schematic block diagram of the receiver input/output module 64 and/or 70. In this embodiment, the data sampling module 82 includes a latch module 100, double-to-single data rate module 102 and buffer 104. As one of average skill in the art will appreciate, the double-to-single data rate module 102 may be omitted when the desired rate of the 1st or 2nd data stream is to be at the same data rate as the input signal 86.

The latch module 100 includes a pair of latches and the double-to-single data rate module 102 includes a pair of flip-flops. The clocking module 84 includes an amplifier 106, phase locked loop 108, and a deskew module 110. In operation, the amplifier 106 receives the reference clock 88 via the physical link and provides it as a reference oscillation to the phase locked loop 108. The phase locked loop 108 may perform a 1-to-1 scaling of the reference clock for HyperTransport mode and may perform a 2-to-1 scaling of the reference clock for system packet interface mode. The deskew module 110, is deactivated when the module 64 or 70 is in the 1st mode (e.g., HT mode) such that the sampling clock and sampling clock inverse, which provide the 1st sampling clock signals 94, directly correspond to the output of phase locked loop 108. When, in the 2nd mode, the deskew module 110 is activated to phase shift the output of the phase locked loop 108 to produce the sampling clock and sampling clock inverse as the 2nd sampling clock signals 94.

Based on the sampling clock and sampling clock inverse, the data sampling module 82 produces an even data stream and an odd data stream which are stored in buffer 104. The data is retrieved from buffer 104 to produce the 1st or 2nd data stream, which includes the even and odd data. The data may be retrieved in 8 bit segments when in the 1st mode of operation and in 16 bit segments when in the 2nd mode of operation.

Figure 8:
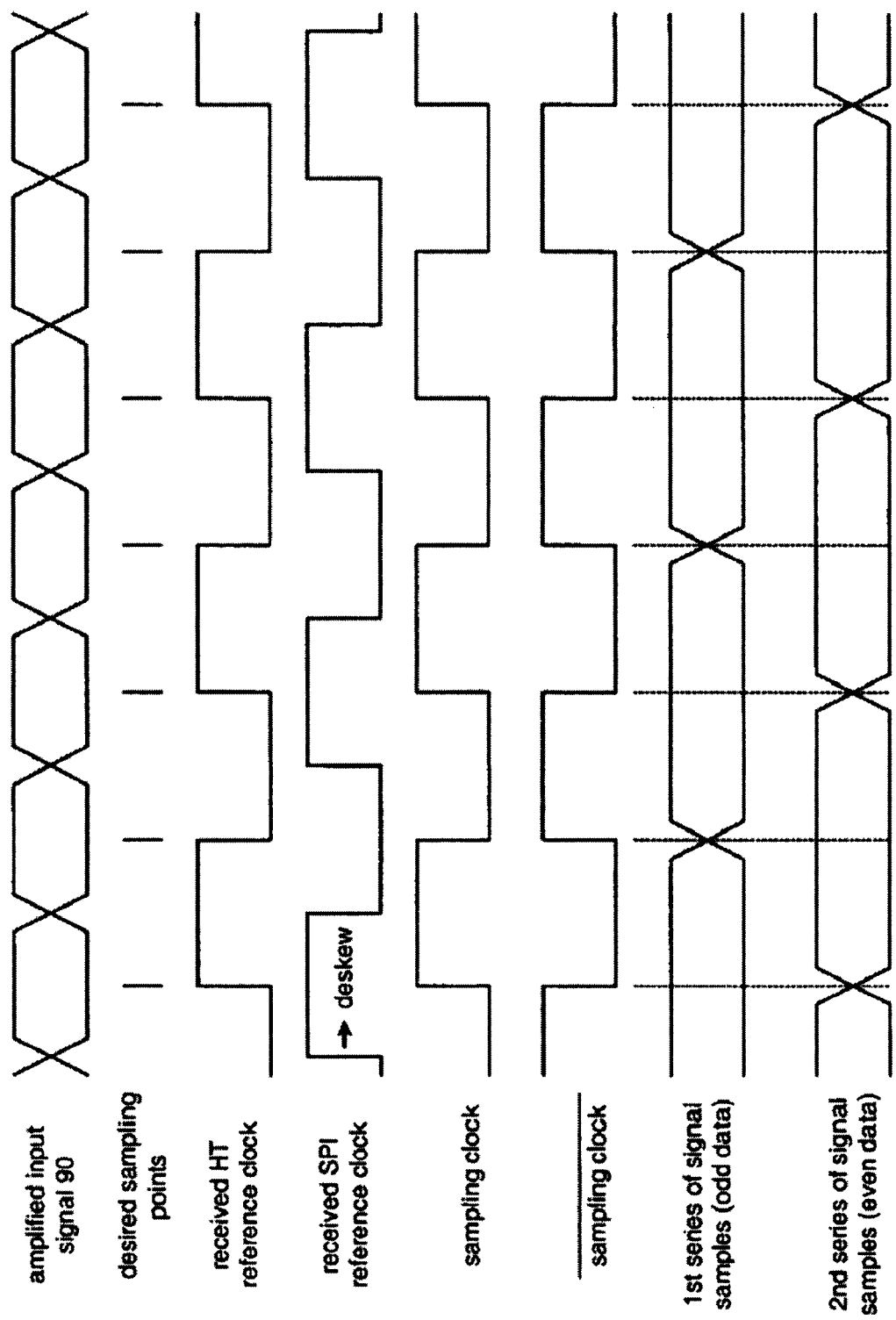
FIG. 8 is a timing diagram of the operation of the receiver input/output interface module of FIG. 6 and/or FIG. 7.

FIG. 8 illustrates a timing diagram of the receiver module 64 and/or 70. As shown, the amplified input signal 90 has a corresponding desired sampling point, which lies as close to the middle between the transitions of the amplified input signal as possible. The timing diagram further illustrates the received HT reference clock, which is time aligned with the desired sampling points, and received SPI reference clock, which is time aligned with the transitions of the input signal 90. Since the received HT reference clock is time aligned with the desired sampling points, the deskew module 110 within the clocking module 84 is deactivated. Conversely, since the received SPI reference clock is time aligned with the transition edges of the amplified input signal 90, the deskew module 110 of the clocking module is activated to shift the phase of the SPI reference clock by approximately 90 degrees.

In the HT mode, the received HT reference clock and an inverse representation thereof may directly correspond to the sampling clock and inverse sampling clock, which are used to sample the input signal 90 to produce the 1st series of signal samples (i.e., odd data) and to produce the 2nd series of signal samples (i.e., even data). For SPI mode, the received SPI reference clock is shifted (i.e., deskewed) and the shifted representation and the inverse thereof are used as the sampling clock and inverse sampling clock. The sampling clock and inverse sampling clock are then used to sample, via the latch module, the amplified input signal 90 and then the complimentary clock signal is used to produce the double-to-single data rate conversion. Accordingly, an odd data stream, or 1st series of signal samples is produced off of the trailing edge of the sampling clock and the 2nd series of signal samples, or even data is produced off of the leading edge of the sampling clock.

Figure 9:
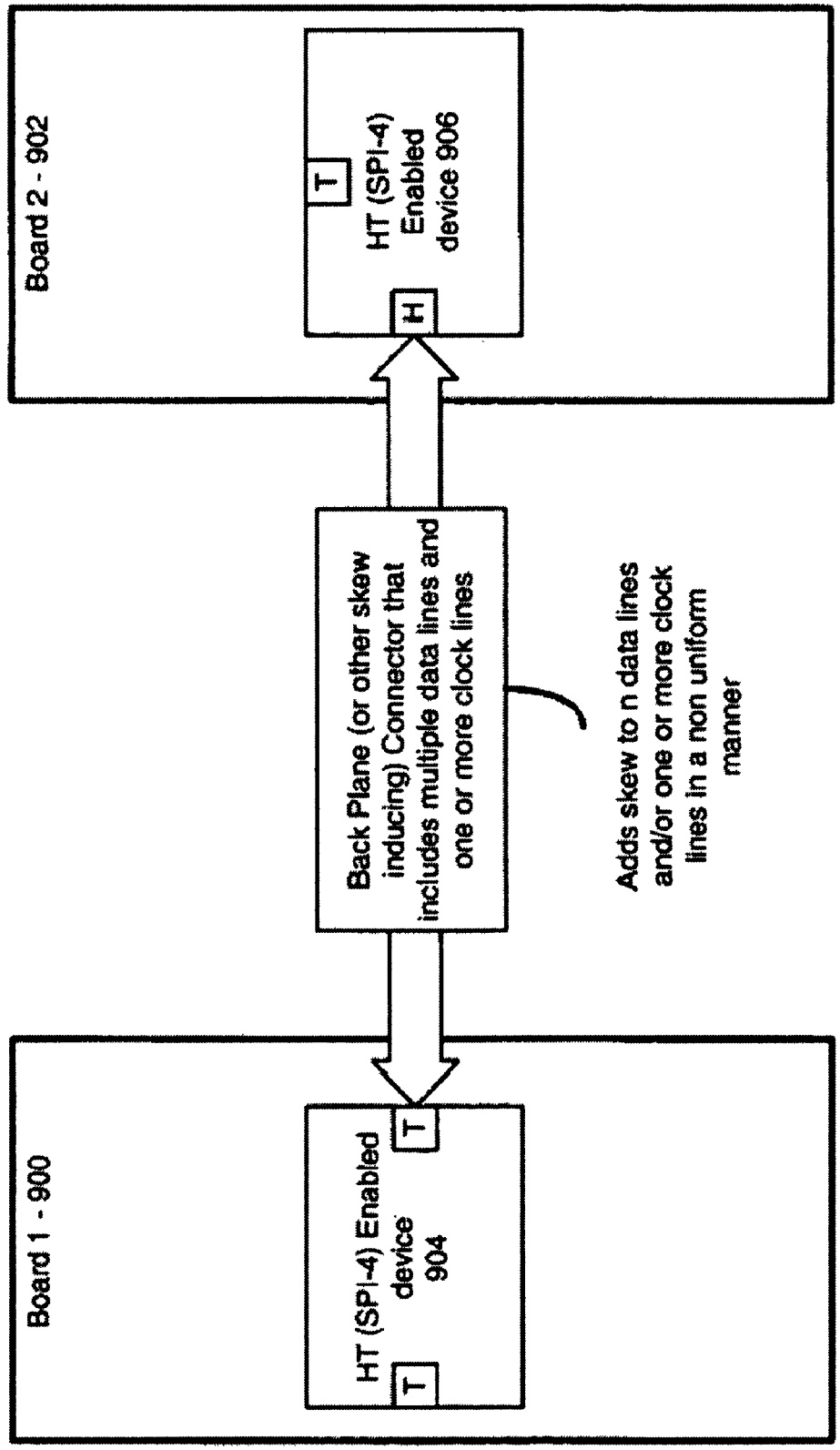
FIG. 9 is a block diagram illustrating the manner in which devices constructed according to the present may communicate across a backplane or other off-board connector.

FIG. 9 is a block diagram illustrating the manner in which devices constructed according to the present may communicate across a backplane or other off-board connector. A first printed circuit board 900 includes mounted thereupon an HT or dual mode HT/SPI-4 enabled device 904 that operates according to at least one version of the HT Standard and that may operate according to at least one version of the SPI Standard, e.g., SPI-4 Standard. A second printed circuit board 902 includes mounted thereupon an HT, SPI-4, or HT/SPI-4 enabled device 906 that operates according to at least one version of the HT Standard and that may operate according to at least one version of the SPI standard. The first printed circuit board 900 and the second printed circuit board 902 inter couple via a back plane connection or another connection that may introduce skew into one or more data lines and/or clock lines of the connection. This connection may include connectors, cabling, and other skew inducing coupling devices. Alternately, the HT enabled devices 904 and 906 may reside on a single board and couple via sloppy traces that induce skew in the data lines and/or clock lines.

As known, the HT Standard (version of HT Standard at time of filing this application) has tight timing requirements that allow for little skew in data signals and clock signals. Thus, with the HT enabled devices 904 and 906 coupled via a connection that introduces skew, the HT enabled devices 904 and 906 would be required to operate at relatively low clocking frequencies to meet the tight skew requirements. Alternately, if the HT enabled devices 904 and 906 also supported the SPI-4 Standard, the HT enabled devices may be required to operate according to the relatively slower SPI-4 Standard. In either case the data throughput between the HT enabled devices 904 and 906 would be slower than is otherwise supportable due to the poor quality of connection coupling the devices.

According to one aspect of the present invention, that will be described further with reference to FIGS. 10-15, one or both of the HT enabled devices 904 and 906 support deskewing operations when operating according to the HT Standard. With these deskewing operations, the HT enabled devices 904 and 906 are capable of interfacing according to the substantially higher data rate HT Standard.

Figure 10:
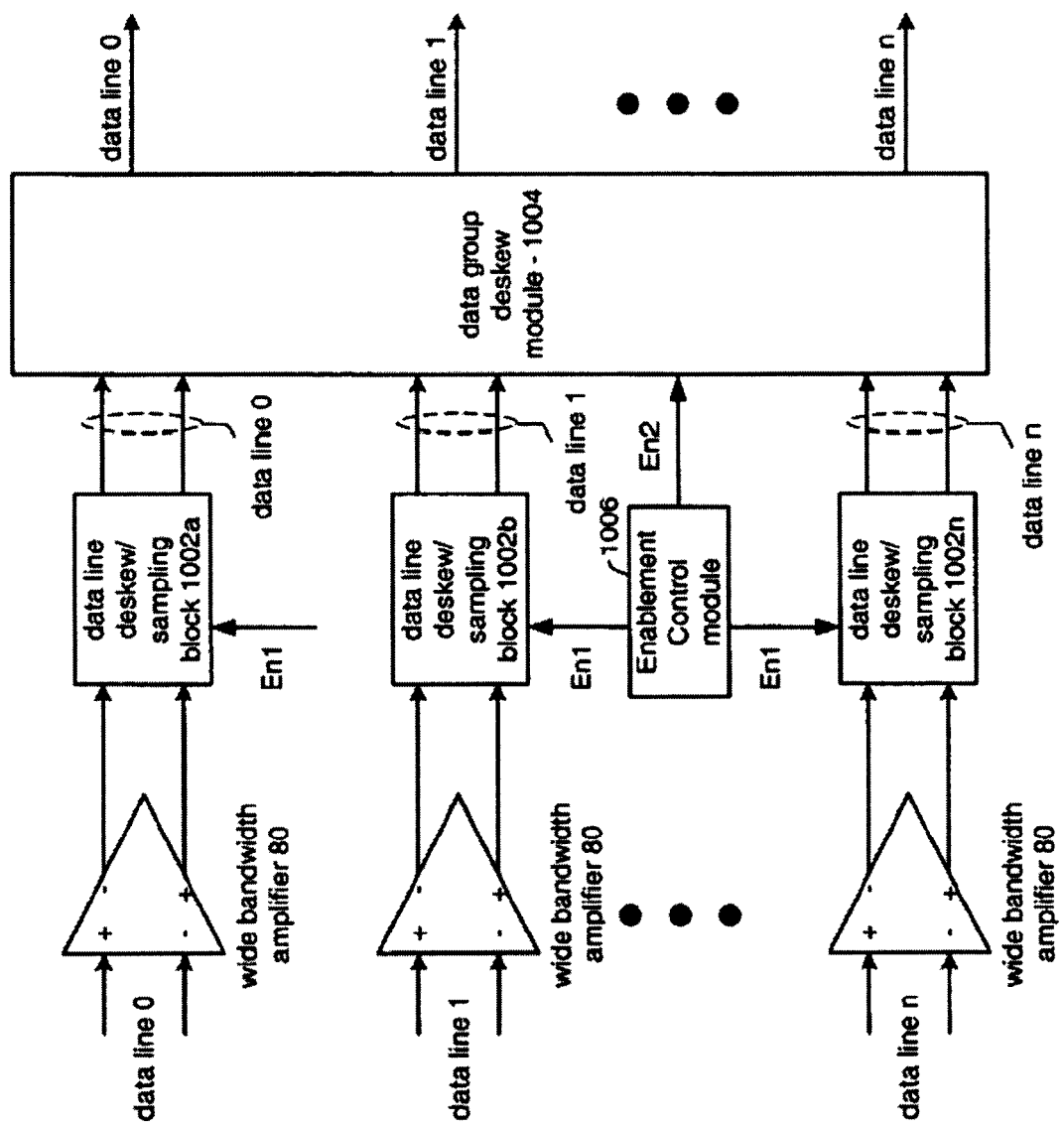
FIG. 10 is a block diagram illustrating a deskew structure according to one embodiment of the present invention.

FIG. 10 is a block diagram illustrating a deskew structure according to one embodiment of the present invention. As shown, a plurality of wideband amplifiers 80 receive respective data lines, date line 0, data line 1, . . . , data line n, and amplify the respectively received signals. The outputs of the wideband amplifiers 80 are received by data line deskew/sampling blocks 1002a, 1002b, . . . , 1002n. The data line deskew/sampling blocks 1002a-1002n receive respective data signals and deskew the data signals by sampling at respective desired sampling points as was generally described with reference to FIG. 8. Because each data signal may be skewed with respect to a corresponding clock signal, each of the data line deskew/sampling blocks 1002a-1002n operates separately upon its respective data signal. One particular structure of a data line deskew/sampling block will be described further with reference to FIG. 11.

Data group deskew module 1004 receives the outputs of data line deskew/sampling blocks 1002a-1002n and removes inter-data line skew, producing deskewed data line outputs. As should be appreciated, because of differing data line lengths, differing data line transmission line characteristics, connector characteristics, etc., the data carried on data lines 0 through n may be skewed with respect to data carried on other data lines. If the time shift is significant enough, the data carried on the data lines may be shifted in time with respect to other of the data lines by one or more bit periods. The data group deskew module 1004 removes data group skew and produces fully deskewed data. One particular embodiment of the data group deskew module 1004 is described further with reference to FIG. 12. The manner in which the data group deskew module 1004 is calibrated for operation is described with reference to FIGS. 13 and 14.

An enablement control module 1006 selectively enables the data line deskew/sampling blocks 1002a-1002n and the data group deskew module 1004 via enable signals En1 and En2. As has been previously described and as will be described further herein with reference to FIGS. 13-15, the illustrated deskewing components are selectively enabled and disabled based upon the operating standard being supported, e.g., HT vs. SPI-4, the data rate being supported, whether a link partner supports deskewing operations, the quality of the physical link with a link partner, and various other considerations. In some operations, the deskew components may be enabled even though a link partner does not support deskewing operations.

Because deskew operations are primarily implemented on the receive side, even though the transmit side does not support deskewing operations, the deskew components on the receive side may be enabled. Further, in some cases, media paths, quality of media, etc. may differ between receive paths and transmit paths of paired devices. In this case, the deskew components may be enabled for only one of the paths.

Figure 11:
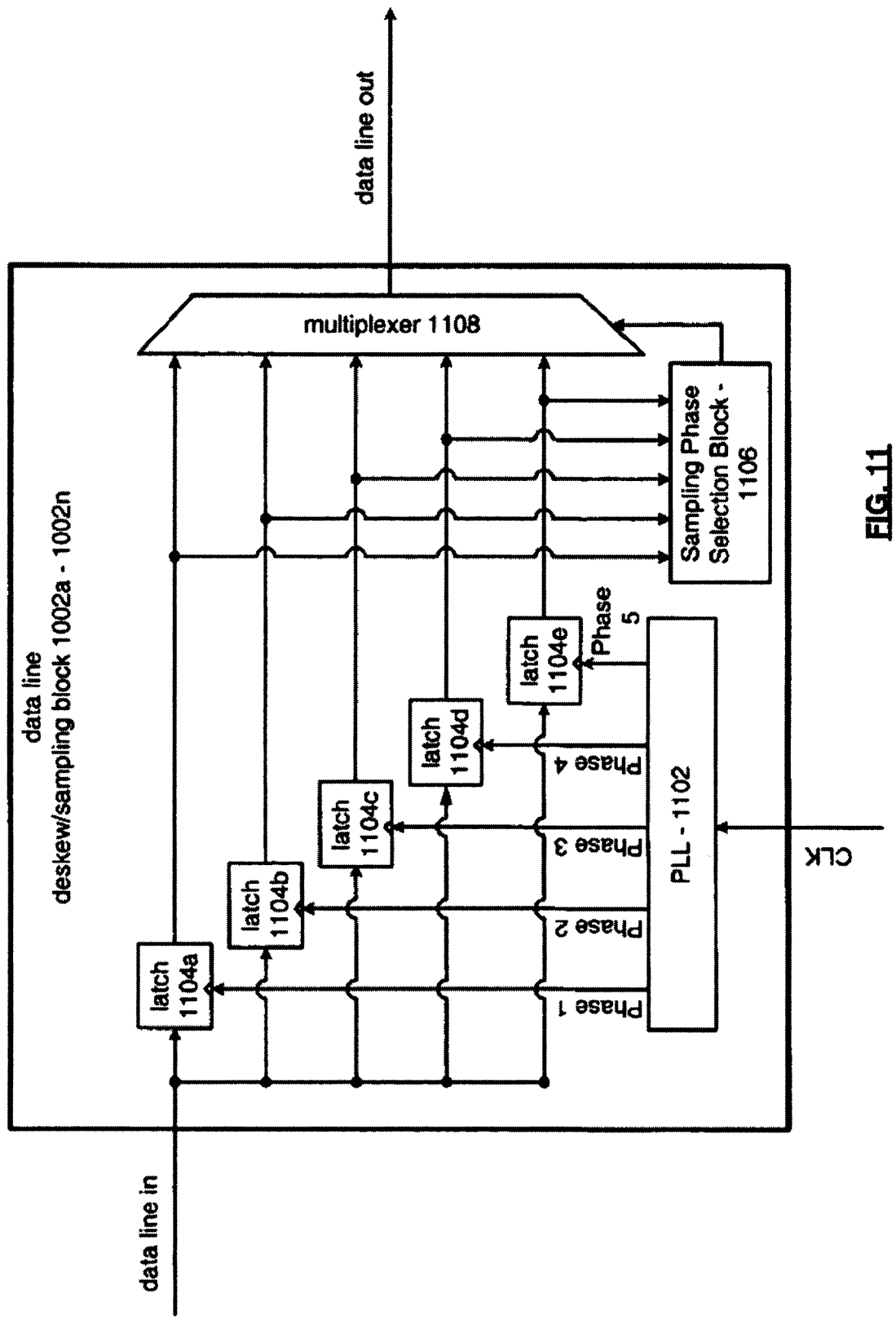
FIG. 11 is a block diagram illustrating one embodiment of a data line deskew/sampling block of FIG. 10 according to the present invention.

FIG. 11 is a block diagram illustrating one embodiment of the data line deskew/sampling block 1002a (1002b-1002n) of FIG. 10 according to the present invention. The data line deskew/sampling block 1002a includes a plurality of latches 1104a-1104e, each of which receives as its clock a respective clock phase of a Phase Locked Loop (PLL) 1102. The PLL 1102 produces the multiple clock phases based upon the CLK input (of FIGS. 7 and 8). Each of the clock phases produced by the PLL 1102 has the frequency of the CLK input but has a corresponding phase offset with respect to the CLK input (and the other clock phases).

The outputs of the latches 1104a-1104e are received by a sampling phase selection block 1106 and by a multiplexer 1108. The sampling phase selection block 1106 detects a transition point of the data carried on the data line (with respect to the clock phases produced by the PLL 1102), selects a correct sampling point for the data, and operates the multiplexer 1108 so that the appropriate sampling point is chosen. These operations are partially illustrated with reference to FIG. 8. One particular technique employed by the sampling phase selection block is to determine between which clock phases the data signal transitions and to sample on a clock phase 180 degrees out of phase with the transitioning phases. The structure of FIG. 11 shows five clock phases. A greater or lesser number of clock phases may be employed in other embodiments.

Figure 12:
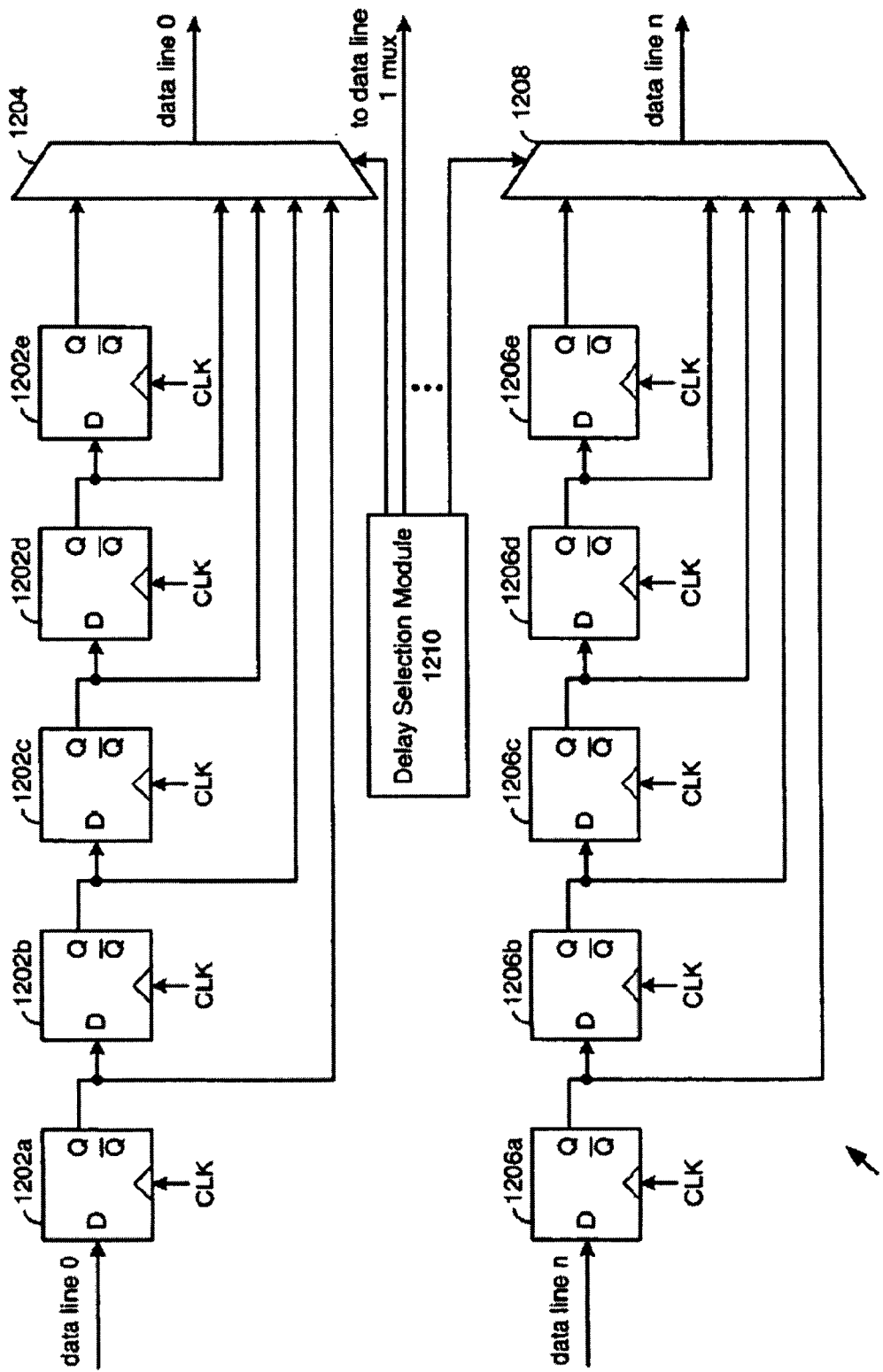
FIG. 12 is a block diagram illustrating one embodiment of a data group deskew module of FIG. 10 according to the present invention.

FIG. 12 is a block diagram illustrating one embodiment of the data group deskew module 1004 of FIG. 10 according to the present invention. For each data line input, the data group deskew module 1004 includes a plurality of cascaded DQ flip-flops, e.g., DQ flip-flops 1202a-1202e for data line 0, DQ flip-flops 1206a-1206e for data line n, etc. Also included for each data line is a multiplexer, e.g., multiplexer 1204 for data line 0, multiplexer 1208 for data line n. Note that FIG. 12 shows only portions of the data group deskew module 1004 corresponding to data line 0 and data line n. The full data group deskew module 1004 includes flip-flop cascades and a multiplexer for each data line.

The outputs of the multiplexers 1202a-1202e serve as inputs to multiplexer 1204. Likewise, the outputs of the multiplexers 1206a-1206e serve as inputs to multiplexer 1208. Based upon outputs of the delay selection module 1210, the multiplexers 1204 and 1208 select differing bit times from data lines 0 and n as produced by the DQ flip-flops of the corresponding DQ flip-flop cascades. Because the output of each DQ flip-flop holds a bit of a corresponding bit time of the corresponding data line, by selecting particular outputs of the DQ flip-flops, the bit times of different data lines may be shifted with respect to one another at the outputs of the multiplexers 1204 and 1208. Resultantly, the data output by the multiplexers 1204 and 1208 is time aligned. While five flip-flops are shown for each data line, lesser or fewer flip-flops may be employed to produce less or more delay adjustment employed to deskew data groups.

The delay selection module 1210 may be set based upon a training sequence, as will be further described with reference to FIGS. 13 and 14. The delay selection module 1210 may be self sufficient in that it receives feedback from the data line outputs and, based upon an observed pattern, adjusts its outputs to cause any inter-line bit time shifting to be removed. Alternatively, the delay selection module may be controlled by a processor, e.g., processing unit 42 or 44 of FIG. 4, or a processing component contained in the Rx MAC 60 of 66. In either scenario, the delay selection module 1210 controls the operations of multiplexers 1204-1208 to remove bit time skew from the data lines.

Figure 13:
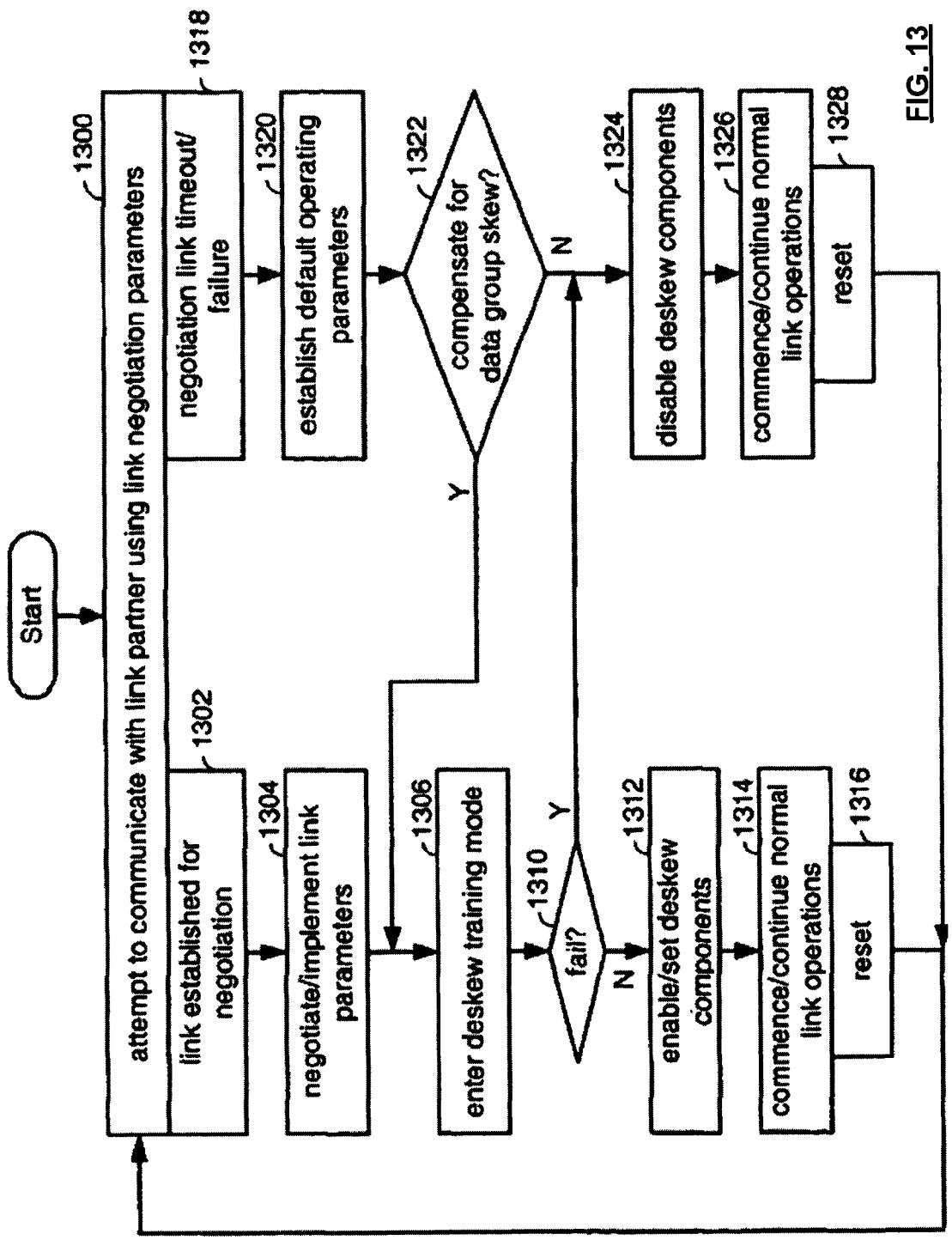
FIG. 13 is a flow diagram illustrating a method for establishing deskew settings according to one embodiment of the present invention.

FIG. 13 is a flow diagram illustrating a method for establishing deskew settings at startup or reset according to one embodiment of the present invention. HT ports and also SPI-4 ports that operate according to the present invention support deskewing operations. An HT port that supports deskewing operations may couple to another HT device that does not support deskewing operations. With this coupling, a HT device that supports deskewing operations may still employ deskewing operations to increase the data rate it supports on the servicing link, even without direct involvement with a link partner. In this case, the HT device must set the deskew components without the benefit of a training sequence produced by a paired device.

Deskew settings are initially determined at startup/reset or immediately after startup/reset. For example, the training sequence may be received during assertion of a HyperTransport reset signal on the servicing media, immediately after de-assertion of a HyperTransport reset signal on the servicing media, periodically during a training interval, or during a HyperTransport CRC testing mode. In some embodiments, the deskew settings are periodically re-determined or checked to ensure that they are correct. Such re-determination of the deskew settings may be performed periodically, when excessive errors are generated upon the HT link, or when another particular event occurs. In one particular embodiment a training sequence is periodically transmitted across the link so that the HT device(s) can re-determine its/their deskew settings.

According to another aspect of the present invention, otherwise idle HT transactions are filled with data having sufficient transitions to cause the data line deskew/sampling blocks to maintain a lock on the data carried on the data lines. By filling the HT transactions with these synchronizing transactions the possibility of error in data receipt is reduced. This particular aspect of the present invention will be described further with reference to FIG. 15.

Operation commences when the HT device attempts to communicate with a link partner using link negotiation parameters (step 1300). According to one aspect of the present invention, paired HT devices support link negotiation operations for link speed, i.e., clocking frequency and data rates, link width, etc. If the paired devices both support deskew operations, startup/reset operations cause the devices to cooperatively determine deskew settings according to FIG. 13. If only one of the paired devices supports deskewing operations, the HT device supporting the deskew operations performs the operations of FIG. 13.

A relatively lower data rate, and perhaps fewer data lines, may be used when negotiating for link parameters. With a link is established for negotiation (step 1302), the HT device negotiates link parameters with a paired HT device and then implements the link parameters that are subsequently employed for data service (step 1304). With the link parameters established, the HT device enters a deskew training mode (step 1306). One embodiment of the deskew training mode will be described further with reference to FIG. 14. In the deskew training mode the HT device attempts to determine/determines deskew settings. If the HT device successfully determines deskew settings (step 1310) the HT device enables the plurality of data line deskew/sampling blocks 1002a-1002n and/or the data group deskew module 1004 to implement the deskew settings (step 1312). The HT device then commences/continues normal link operations (step 1314) and continues such operations until reset (step 1316) at which point operation returns to step 1300.

If the HT device fails to successfully enter negotiation with the paired HT device (step 1318), the HT device establishes default operating parameters for the HT link (step 1320). Then the HT device determines whether to compensate for skew on the link (step 1322). If the HT device does compensate for skew, operation proceeds to step 1306. If not, the HT device disables its deskew components (step 1324). The HT device then commences/continues normal link operations (step 1326) and continues such operations until reset (step 1328) at which point operation returns to step 1300.

Figure 14:
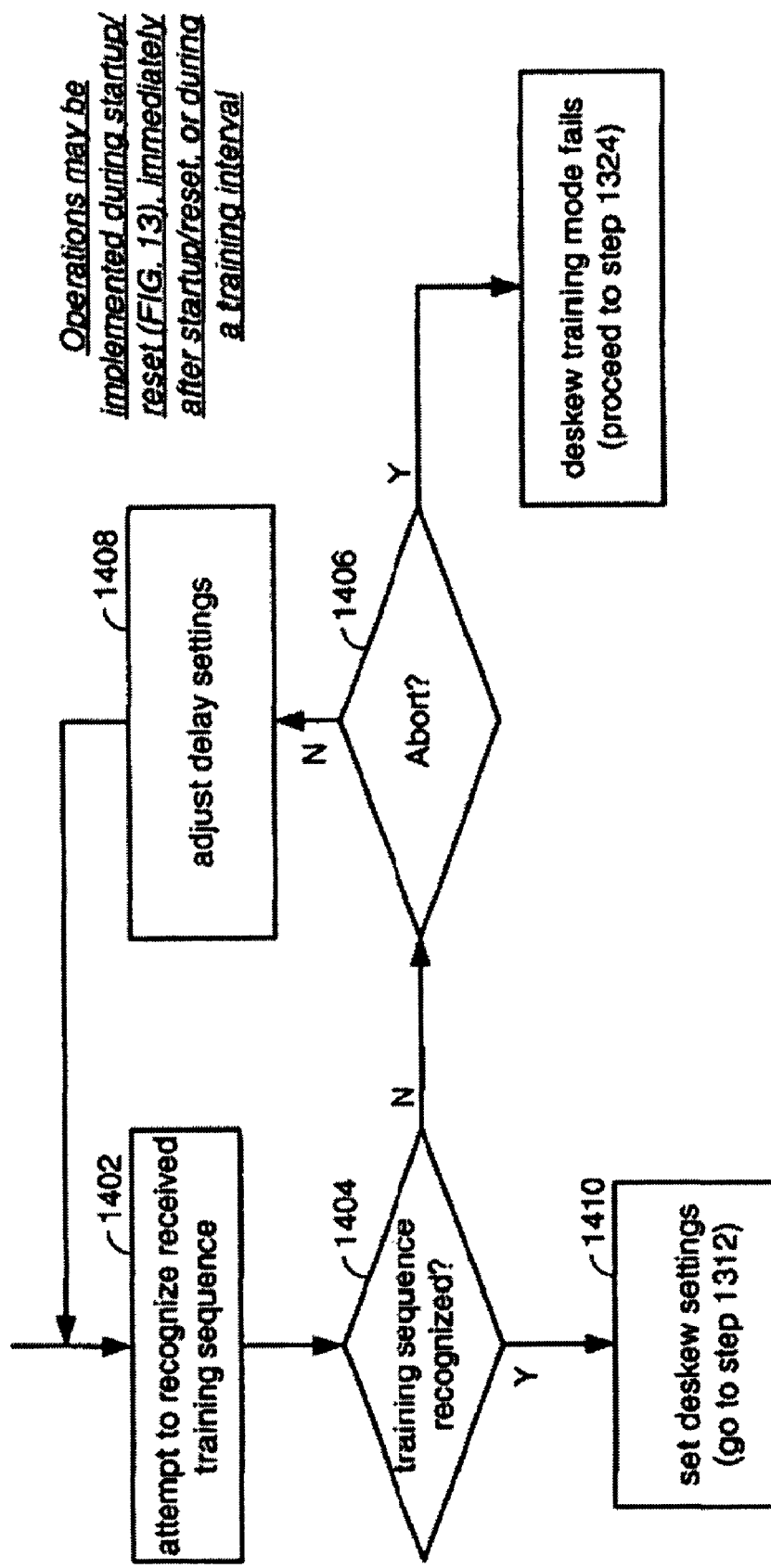
FIG. 14 is a flow diagram illustrating a method for determining deskew settings using a training sequence according to an embodiment of the present invention.

FIG. 14 is a flow diagram illustrating a method for determining deskew settings using a training sequence according to an embodiment of the present invention. The training sequence may be received during startup or reset, immediately after startup or reset completes, or may be received periodically during idle periods. For example, the training sequence may be received during assertion of a HyperTransport reset signal on the servicing media, immediately after de-assertion of a HyperTransport reset signal on the servicing media, periodically during a training interval, or during a HyperTransport CRC testing mode, for example.

The paired HT device transmits the training sequence and the HT device attempts to recognize the received training sequence (step 1402). If the training sequence is not recognized (as determined at step 1404), the HT device determines whether to abort the deskew training mode (at step 1406). If the deskew training mode is not aborted, the HT device adjusts the deskew settings (step 1408) and operation returns to step 1402. If deskew training is aborted operation proceeds to step 1324 of FIG. 13. If the training sequence is recognized (as determined at step 1404), the deskew components are enabled using the deskew settings (step 1410).

FIG. 15 is a flow diagram illustrating a method for filling HT transactions with transition rich data employed to maintain synchronization of deskew circuitry by a receiving HT device according to an embodiment of the present invention. During a busy HT transaction (step 1510), the HT transaction carries data (step 1512), and the HT transaction is transmitted upon the HT link (step 1514). However, not all HT cycles are required to service HT transactions, i.e. they would otherwise be idle. When an HT transaction/cycle is idle (step 1504), the HT transaction is filled with dummy data that is rich with transitions (or the training sequence) (step 1506) and the filled HT transaction is transmitted upon the HT link (step 1508). The HT transaction may also include an indication that the HT transaction carries the dummy data or training sequence.

During this idle HT transaction cycle, a receiving HT device receives the HT transaction (or training sequence) on the HT link and maintains synchronization due to the transition rich data carried by the HT device. However, because the HT transaction also carries an indication that the transaction does not carry data the HT receiver ignores processing of the transaction. Thus, the "dummy" HT transaction serves only to maintain synchronization of the HT link that is subject to skew and whose characteristics may change over time with variation in temperature, positioning of cables, etc.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "coupled". As one of average skill in the art will further appreciate, the term "compares favorably", as may be used herein, indicates that a comparison between two or more elements, items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal.

What is claimed is:

1. A dual mode digital interface that supports a HyperTransport Standard and at least one other interface standard, the dual mode digital interface comprising:
    a plurality of data line deskew/sampling blocks coupled to a physical interface to receive incoming data on a respective data line of a plurality of data lines, each of the data line deskew/sampling blocks is operable to deskew and sample the incoming data on the respective data line based upon a clock signal to produce deskewed data;
    a data group deskew module coupled to the plurality of data line deskew/sampling blocks, wherein the data group deskew module receives the deskewed data and removes inter-data line skew from the deskewed data to produce received data; and
    an enablement control module is operable to configure the plurality of data line deskew/sampling blocks and the data group deskew module in a first mode when supporting an aspect of the HyperTransport Standard and in a second mode when supporting the at least one other interface standard.

2. The dual mode digital interface of claim 1, wherein:
    the enablement control module is operable to disable the plurality of data line deskew/sampling blocks and the data group deskew module when operating according to the aspect of the HyperTransport Standard having first skew tolerances; and
    the enablement control module is operable to enable the plurality of data line deskew/sampling blocks and the data group deskew module when operating according to the aspect of the HyperTransport Standard having second skew tolerances that are less stringent than the first skew tolerances.

3. The dual mode digital interface of claim 1, wherein the at least one other interface standard includes a System Packet Interface 4 (SPI-4) Standard.

4. The dual mode digital interface of claim 1, wherein the plurality of data line deskew/sampling blocks and the data group deskew module are set based upon a training sequence received from a link partner.

5. The dual mode digital interface of claim 4, wherein the training sequence is received during assertion of a HyperTransport reset signal on a servicing media.

6. The dual mode digital interface of claim 4, wherein the training sequence is received immediately after de-assertion of a HyperTransport reset signal on a servicing media.

7. The dual mode digital interface of claim 4, wherein the training sequence is periodically received in a training interval.

8. The dual mode digital interface of claim 4, wherein the training sequence is received during a HyperTransport Cyclical Redundancy Check (CRC) testing mode.

9. A method for extracting received data from a plurality of incoming digital streams while supporting a HyperTransport Standard and at least one other interface standard, the method comprising:
   when supporting a first aspect of the HyperTransport Standard, sampling each incoming data stream of a data line of a plurality of data lines based upon a clock signal to produce received data without deskewing the each incoming data stream; and
   when supporting the at least one other interface standard:
      optionally deskewing and sampling the each incoming data stream based upon the clock signal to produce a plurality of deskewed data streams; and
      optionally removing inter-data stream skew from the plurality of deskewed data streams to produce the received data.

10. The method of claim 9, further comprising, when supporting a second aspect of the HyperTransport Standard having less stringent skew tolerances than skew tolerances of the first aspect of the HyperTransport Standard:
   deskewing and sampling each incoming data stream based upon the clock signal to produce a plurality of deskewed data streams; and
   removing inter-data stream skew from the plurality of deskewed data streams to produce the received data.

11. The method of claim 9, wherein the at least one other interface standard includes a System Packet Interface 4 (SPI-4) Standard.

12. The method of claim 9, further comprising determining deskew settings based upon a training sequence received from a link partner.

13. The method of claim 12, wherein the training sequence is received during assertion of a HyperTransport reset signal on the servicing media.

14. The method of claim 12, wherein the received training sequence is received immediately after de-assertion of a HyperTransport reset signal on the servicing media.

15. The method of claim 12, wherein the received training sequence is periodically received in a training interval.

16. The method of claim 12, wherein the training sequence is received during a HyperTransport Cyclic Redundancy Check (CRC) testing mode.

17. A digital interface that supports a HyperTransport Standard comprising:
   a plurality of data line deskew/sampling blocks coupled to a physical interface to receive incoming data on a respective data line, each data line deskew/sampling block operable to deskew and sample the incoming data on the respective data line based upon a clock signal to produce deskewed data; and
   a data group deskew module coupled to the plurality of data line deskew/sampling blocks, the data group deskew module receives the deskewed data from each of the plurality of data line deskew/sampling blocks and removes inter-data line skew from the deskewed data to produce received data,
   wherein the plurality of data line deskew/sampling bocks and/or the data group deskew module are set based upon deskew settings determined from a training sequence received from a link partner to produce the received data.

18. The digital interface of claim 17, wherein the training sequence is received during assertion of a HyperTransport reset signal on a servicing media.

19. The digital interface of claim 18, wherein the training sequence is received immediately after de-assertion of a HyperTransport reset signal on a servicing media.

20. The digital interface of claim 18, wherein the training sequence is received from at least one of a training interval and a HyperTransport Cyclic Redundancy Check (CRC) testing mode.

* * * * *